(12) United States Patent
Bishop

(10) Patent No.: US 8,719,348 B2
(45) Date of Patent: *May 6, 2014

(54) SENDER-CONTROLLED REMOTE E-MAIL ALERTING AND DELIVERY

(75) Inventor: Michael Bishop, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1396 days.

This patent is subject to a terminal disclaimer.

(21) Appl. No.: 11/678,368

(22) Filed: Feb. 23, 2007

(65) Prior Publication Data

US 2008/0205610 A1    Aug. 28, 2008

(51) Int. Cl.
*G06F 15/16*    (2006.01)

(52) U.S. Cl.
USPC .......................................... 709/206; 709/207

(58) Field of Classification Search
None
See application file for complete search history.

(56) References Cited

U.S. PATENT DOCUMENTS

| | | | |
|---|---|---|---|
| 5,163,130 A | 11/1992 | Hullot | |
| 5,475,738 A | 12/1995 | Penzias | |
| 5,479,411 A | 12/1995 | Klein | |
| 5,862,325 A | 1/1999 | Reed | |
| 5,944,786 A * | 8/1999 | Quinn | 709/206 |
| 5,995,597 A * | 11/1999 | Woltz et al. | 379/93.24 |
| 6,009,469 A | 12/1999 | Mattaway et al. | |
| 6,035,273 A | 3/2000 | Spies | |
| 6,052,442 A | 4/2000 | Cooper et al. | |
| 6,064,990 A | 5/2000 | Goldsmith | |
| 6,108,688 A * | 8/2000 | Nielsen | 709/206 |
| 6,131,121 A | 10/2000 | Mattaway et al. | |
| 6,175,859 B1 * | 1/2001 | Mohler | 709/206 |
| 6,212,265 B1 | 4/2001 | Duphorne | |
| 6,226,678 B1 | 5/2001 | Mattaway et al. | |
| 6,243,681 B1 | 6/2001 | Guji et al. | |
| 6,249,808 B1 | 6/2001 | Seshadri | |
| 6,263,064 B1 | 7/2001 | O'Neal et al. | |
| 6,282,183 B1 | 8/2001 | Harris | |
| 6,335,963 B1 * | 1/2002 | Bosco | 379/88.12 |
| 6,345,288 B1 | 2/2002 | Reed | |
| 6,349,336 B1 | 2/2002 | Sit et al. | |
| 6,351,523 B1 | 2/2002 | Detlef | |
| 6,400,810 B1 * | 6/2002 | Skladman et al. | 379/93.24 |
| 6,421,781 B1 | 7/2002 | Fox et al. | |
| 6,453,337 B2 | 9/2002 | Miller et al. | |
| 6,457,045 B1 | 9/2002 | Hanson et al. | |
| 6,463,145 B1 | 10/2002 | O'Neal et al. | |
| 6,507,643 B1 | 1/2003 | Groner | |
| 6,560,456 B1 | 5/2003 | Lohtia et al. | |
| 6,633,630 B1 | 10/2003 | Owens et al. | |

(Continued)

OTHER PUBLICATIONS

Lewis; U.S. Appl. No. 10/080,484, filed Feb. 22, 2002.

(Continued)

*Primary Examiner* — Azizul Choudhury
(74) *Attorney, Agent, or Firm* — Wolff & Samson, PC

(57) ABSTRACT

Embodiments of the present disclosure provide message notification systems and methods. Briefly described, one embodiment of a message notification method can be broadly summarized by the following: receiving a new message at a first inbox of a recipient, the new message having a request for a triggering event to be set such that a notification message for the new message is sent to a second inbox if the triggering event occurs and setting the triggering event if a first messaging device is set by the recipient to allow sender-forced notifications. Other methods and systems are also provided.

14 Claims, 26 Drawing Sheets

(56) References Cited

U.S. PATENT DOCUMENTS

| | | | |
|---|---|---|---|
| 6,633,848 B1 | 10/2003 | Johnson et al. | |
| 6,640,301 B1 | 10/2003 | Ng | |
| 6,647,260 B2 | 11/2003 | Dusse et al. | |
| 6,711,154 B1 | 3/2004 | O'Neal | |
| 6,721,784 B1 * | 4/2004 | Leonard et al. | 709/206 |
| 6,728,731 B2 | 4/2004 | Sarukkai et al. | |
| 6,732,151 B1 | 5/2004 | Tobias et al. | |
| 6,738,820 B2 | 5/2004 | Hilt | |
| 6,742,127 B2 | 5/2004 | Fox | |
| 6,754,181 B1 | 6/2004 | Elliott et al. | |
| 6,766,299 B1 | 7/2004 | Bellomo et al. | |
| 6,775,690 B1 * | 8/2004 | Creswell et al. | 709/206 |
| 6,895,558 B1 | 5/2005 | Loveland | |
| 6,965,918 B1 | 11/2005 | Arnold et al. | |
| 6,981,062 B2 | 12/2005 | Suryanarayana | |
| 6,987,840 B1 | 1/2006 | Bosik | |
| 7,047,532 B1 | 5/2006 | Connelly | |
| 7,085,812 B1 | 8/2006 | Sherwood | |
| 7,113,501 B2 | 9/2006 | Garakani | |
| 7,120,671 B2 * | 10/2006 | Gusler et al. | 709/206 |
| 7,136,475 B1 | 11/2006 | Rogers | |
| 7,196,807 B2 | 3/2007 | Goldstone | |
| 7,240,095 B1 * | 7/2007 | Lewis | 709/206 |
| 7,305,441 B2 * | 12/2007 | Mathewson et al. | 709/206 |
| 7,505,759 B1 | 3/2009 | Rahman | |
| 7,590,539 B1 | 9/2009 | Kirkpatrick | |
| 7,609,820 B2 | 10/2009 | Bedingfield, Sr. | |
| 8,090,785 B2 | 1/2012 | Kirkpatrick | |
| 2002/0032741 A1 | 3/2002 | Hilt | |
| 2002/0035607 A1 | 3/2002 | Checkoway et al. | |
| 2002/0061003 A1 | 5/2002 | Sumner et al. | |
| 2002/0064137 A1 | 5/2002 | Garakani et al. | |
| 2002/0155848 A1 | 10/2002 | Suryanarayana | |
| 2003/0055902 A1 | 3/2003 | Amir et al. | |
| 2003/0072451 A1 | 4/2003 | Pimentel et al. | |
| 2003/0142364 A1 | 7/2003 | Goldstone | |
| 2003/0177171 A1 | 9/2003 | Brown et al. | |
| 2004/0068665 A1 | 4/2004 | Fox et al. | |
| 2004/0086094 A1 | 5/2004 | Bosik | |
| 2004/0087300 A1 | 5/2004 | Lewis | |
| 2005/0100143 A1 | 5/2005 | Bedingfield | |
| 2006/0056603 A1 | 3/2006 | Harrity | |
| 2008/0205602 A1 | 8/2008 | Bishop | |

OTHER PUBLICATIONS

Bishop; U.S. Appl. No. 11/678,423, filed Feb. 23, 2007.
Lewis; Non-Final Rejection mailed Apr. 7, 2005; U.S. Appl. No. 10/080,484, filed Feb. 22, 2002.
Lewis; Final Rejection mailed Oct. 5, 2005; U.S. Appl. No. 10/080,484, filed Feb. 22, 2002.
Lewis; Non-Final Rejection mailed Apr. 10, 2006; U.S. Appl. No. 10/080,484, filed Feb. 22, 2002.
Lewis; Final Rejection mailed Sep. 28, 2006; U.S. Appl. No. 10/080,484, filed Feb. 22, 2002.
Lewis; Notice of Allowance and Fees Due mailed Mar. 6, 2007; U.S. Appl. No. 10/080,484, filed Feb. 22, 2002.
Bedingfield; Notice of Allowance mailed Feb. 24, 2009 for U.S. Appl. No. 10/706,361, filed Nov. 12, 2003.
Kirkpatrick; Notice of Allowance mailed Jan. 8, 2009 for U.S. Appl. No. 09/604,965, filed Jun. 28, 2000.
Kirkpatrick; Supplemental Notice of Allowance mailed Aug. 20, 2009 for U.S. Appl. No. 09/604,965, filed Jun. 28, 2000.
Kirkpatrick; U.S. Appl. No. 09/604,965, filed Jun. 28, 2000.
Kirkpatrick; Advisory Action mailed Feb. 13, 2004 for U.S. Appl. No. 09/604,965, filed Jun. 28, 2000.
Kirkpatrick; Examiner Interview Summary mailed Sep. 27, 2004 for U.S. Appl. No. 09/604,965, filed Jun. 28, 2000.
Kirkpatrick; Examiner Interview Summary Record mailed Jan. 23, 2008 for U.S. Appl. No. 09/604,965, filed Jun. 28, 2000.
Kirkpatrick; Final Rejection mailed Jan. 23, 2007 for U.S. Appl. No. 09/604,965, filed Jun. 28, 2000.
Kirkpatrick; Final Rejection mailed Aug. 4, 2004 for U.S. Appl. No. 09/604,965, filed Jun. 28, 2000.
Kirkpatrick; Final Rejection mailed Nov. 24, 2003 for U.S. Appl. No. 09/604,965, filed Jun. 28, 2000.
Kirkpatrick; Non-Final Rejection mailed Mar. 11, 2004 for U.S. Appl. No. 09/604,965, filed Jun. 28, 2000.
Kirkpatrick; Non-Final Rejection mailed May 30, 2008 for U.S. Appl. No. 09/604,965, filed Jun. 28, 2000.
Kirkpatrick; Non-Final Rejection mailed Jun. 4, 2003 for U.S. Appl. No. 09/604,965, filed Jun. 28, 2000.
Kirkpatrick; Non-Final Rejection mailed Jul. 25, 2006 for U.S. Appl. No. 09/604,965, filed Jun. 28, 2000.
Kirkpatrick; Non-Final Rejection mailed Nov. 27, 2007 for U.S. Appl. No. 09/604,965, filed Jun. 28, 2000.
Kirkpatrick; Non-Final Rejection mailed Dec. 19, 2002 for U.S. Appl. No. 09/604,965, filed Jun. 28, 2000.
Lewis; Final Rejection mailed Sep. 28, 2006 for U.S. Appl. No. 10/080,484, filed Feb. 22, 2002.
Lewis; Final Rejection mailed Oct. 5, 2005 for U.S. Appl. No. 10/080,484, filed Feb. 22, 2002.
Lewis; Non-Final Rejection mailed Apr. 7, 2005 for U.S. Appl. No. 10/080,484, filed Feb. 22, 2002.
Lewis; Non-Final Rejection mailed Apr. 10, 2006 for U.S. Appl. No. 10/080,484, filed Feb. 22, 2002.
Lewis; Notice of Allowance and Fees Due mailed Mar. 6, 2007 for U.S. Appl. No. 10/080,484, filed Feb. 22, 2002.
Kirkpatrick, U.S. Appl. No. 12/423,840, filed Apr. 15, 2009.
Bedingfield; U.S. Appl. No. 10/706,361, filed Nov. 12, 2003.
Bedingfield; Final Rejection mailed Oct. 20, 2008 for U.S. Appl. No. 10/706,361, filed Nov. 12, 2003.
Bedingfield; Non-Final Rejection mailed Jan. 11, 2008 for U.S. Appl. No. 10/706,361, filed Nov. 12, 2003.
Kirkpatrick; Non-Final Office Action mailed Dec. 9, 2010 for U.S. Appl. No. 12/423,840, filed Apr. 15, 2009.
Bishop; Non-Final Office Action mailed Dec. 22, 2010 for U.S. Appl. No. 11/678,423, filed Feb. 23, 2007.
Kirkpatrick; Notice of Allowance mailed May 13, 2011 for U.S. Appl. No. 12/423,840, filed Apr. 15, 2009.
Final Office Action mailed Jun. 8, 2011 for U.S. Appl. No. 11/678,423, filed Feb. 23, 2007.
Bishop; Non-Final Office Action mailed Jan. 3, 2012 for U.S. Appl. No. 11/678,423, filed Feb. 23, 2007.

* cited by examiner

350

USER PROFILE

ADDRESS FOR SENDING TEXT MESSAGES: | 7705552211@text.com | 355

EMAIL ADDRESS: | john@mail.com | 360

ADDRESS FOR SENDING VOICE MESSAGES: | 770-555-2211 | 365

INSTANT MESSAGING ADDRESS: | john@im.com | 370

ADDRESS FOR SENDING VOICE MAIL ADDRESS: | 6785553355@vm.com | 375

FIG. 3C

```
. . .                                              1395
DATE: SAT, 7 JUN 2001 12:35:58 -0700
FROM: MOM <DOROTHY@EM.COM>
TO: JOHN <JOHN@MAIL.COM>
SUBJECT: WEEKEND PLANS
MESSAGE-ID:
<20030607123558.A2408@XXX.COM>
X-SENDER-FORCED REQUEST: YES
X-TIME PERIOD: 120
                                          1396
. . .
```

FIG. 13C

SENDER-CONTROLLED REMOTE E-MAIL ALERTING AND DELIVERY

CROSS-REFERENCE TO RELATED APPLICATION

This application is related to copending U.S. utility patent application entitled "Recipient-Controlled Remote Email Alerting and Delivery" filed on the same date herewith and accorded Ser. No. 11/678,423, which is entirely incorporated herein by reference.

COPYRIGHT NOTICE (Not applicable).

STATEMENT REGARDING FEDERALLY SPONSORED RESEARCH OR DEVELOPMENT (Not applicable).

TECHNICAL FIELD

The present disclosure is generally related to computer networks and, more particularly, is related to network messaging.

BACKGROUND

Electronic mail, such as email, is one type of network messaging. With email, users often have multiple email accounts and associated inboxes where email messages are delivered. A user often also has an email client device that is used to log into an email server to access messages found in an inbox associated with a particular email account. Often, a user may have more than one email client device used to access more than one messaging inbox. Also, a user may use one email client device (and inbox) much more often than another email client device.

In order to determine if new email messages exist, the user may check his or her inbox for new messages. As a result, the user may have to access multiple inboxes from multiple client devices. Accordingly, newly delivered mail at an infrequently-used client device or inbox may then go undetected. This problem exists for a variety of messaging schemes in general and is not restricted to email.

Thus, a heretofore unaddressed need exists in the industry to address the aforementioned deficiencies and inadequacies.

SUMMARY

Embodiments of the present disclosure provide message notification systems and methods. Briefly described, one embodiment of a message notification method can be broadly summarized by the following: receiving a new message at a first inbox of a recipient, the new message having a request for a triggering event to be set such that a notification message for the new message is sent to a second inbox if the triggering event occurs and setting the triggering event if a first messaging device is set by the recipient to allow sender-forced notifications.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3C is a diagram of an exemplary interface for displaying profile information to be used in the system of FIG. 1.

DETAILED DESCRIPTION

Disclosed herein are systems and methods for message notification. To facilitate a description of various embodiments, an example system that can be used to implement the systems and methods for message notification is discussed with reference to the figures. Although this system is described in detail, it will be appreciated that this system is provided for purposes of illustration only and that various modifications are feasible.

For example, while several embodiments are described in connection with these drawings, there is no intent to limit the invention to the embodiment or embodiments disclosed herein. On the contrary, the intent is to cover all alternatives, modifications, and equivalents. Additionally, while the following description and accompanying drawing specifically describe an email messaging environment, it will be clear to one of ordinary skill in the art that the systems and methods presented herein may be extended to other messaging protocols such as text messaging (e.g., short messaging service), instant messaging (IM), etc. After the example system has been described, examples of operation of the system will be provided to explain one manner in which the system can be used to provide for new message notification.

Figure 1:
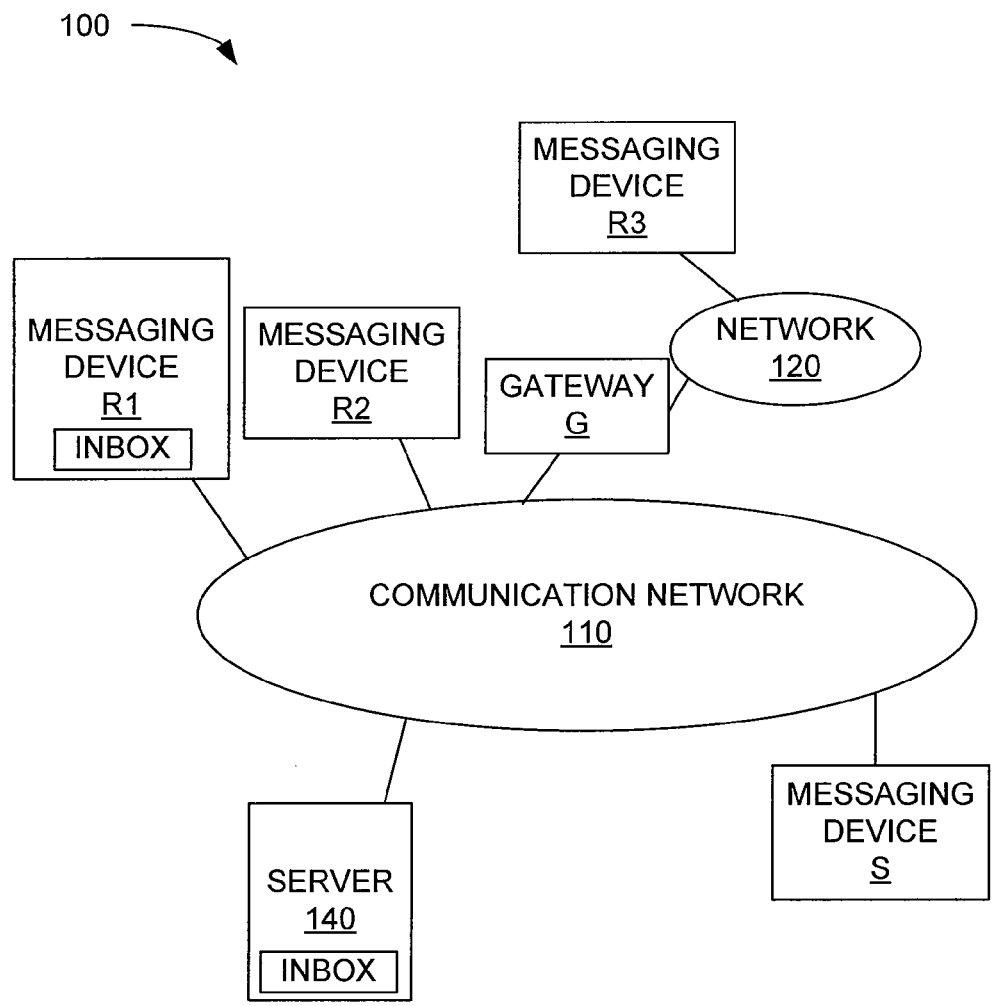
FIG. 1 is a block diagram depicting an embodiment, among others, of a message notification system.

FIG. 1 is a block diagram depicting an embodiment, among others, of a notification system 100. In this system, a user having a messaging device (e.g., an email configured processing device) R1 may wish to be notified of any or certain messages received on the device R1 from a communications network 110. For example, the user may not regularly check the particular device R1 for messages. Therefore, if the user receives a message on the device R1, the user may desire to be notified or alerted of the received message at another messaging device R2, R3 that the user also uses.

The communication network 110 enables network devices to communicate. For example, the user's messaging device R1 is shown to be coupled to the network 110. Also, another user's messaging device S is shown to be coupled to the network 110. Messaging devices, such as the messaging devices S and R1, are used to send electronic messages to other messaging devices. Therefore, a user of the messaging device S may send an electronic message to the messaging device R1.

In accordance with an embodiment of the present disclosure, the messaging device R1 may be configured to send a notification message to another messaging device, such as the messaging device R2, of the user (e.g., recipient). According to exemplary embodiments, the notification message is intended to inform or alert the recipient of the arrival of the new message (sent by the messaging device S) at the messaging device R1.

The messaging device R1 may be configured to send such a notification message to another messaging device, such as the messaging device R2, on the network 110 which is also used (and may also be more regularly used) by the recipient. After the recipient is informed of the arrival of the new message via the notification message, the recipient may then access the new message remotely from the messaging device R1.

The messaging device R1 may also be configured to send a notification message to another messaging device, such as the messaging device R3, that is part of another or secondary messaging network 120. To do so, the notification message may be sent to a gateway device G from the messaging device R1. The gateway device G formats the notification message in an acceptable format for the secondary messaging network 120 and then sends the notification message to the messaging device R3 which is coupled to the secondary messaging network 120. A variety of gateway devices and secondary messaging networks 120 may be implemented in various embodiments. For example, a wireless telephone network, a short-messaging service, a voicemail network (e.g., AMIS (Automated Messaging Interface Specification), VMIP (Voice Profile for Internet Mail)), a PSTN (Public Switched Telephone Network) network, etc. and corresponding gateways can all be used as secondary networks in one or more different embodiments.

Figure 2:
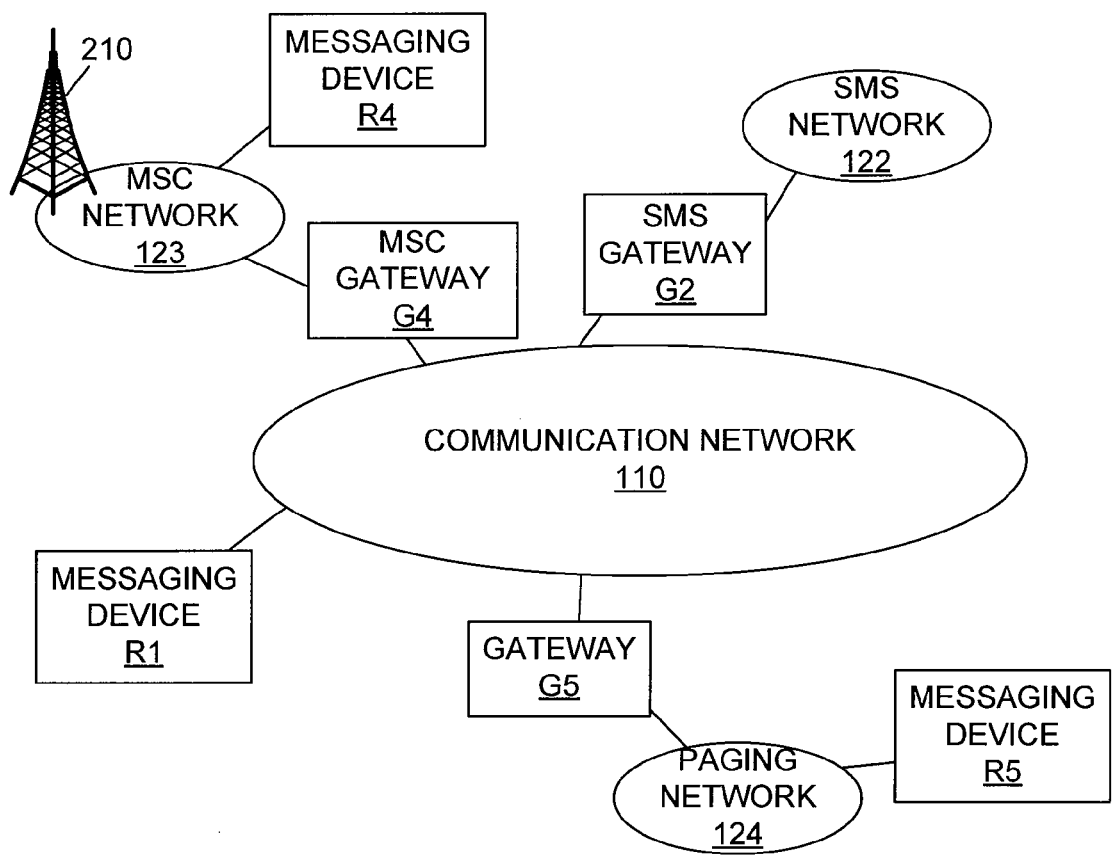
FIG. 2 is a block diagram of an embodiment of the system of FIG. 1 that features an SMS messaging center and mobile switching center.

In one embodiment, a short message service message center G2 (hereinafter "SMS message center") is in communication with an SMS network 122, as illustrated in FIG. 2. The SMS messaging center G2 is also in communication with a mobile switching center G4 (hereinafter "MSC") (which is in communication with an MSC network 123), as shown in FIG. 2. The MSC G4 is in communication with a radio tower 210 and provides communication to and from a mobile communication device R4. The mobile communication device R4 receives SMS or text notification messages from the SMS message center G2. The mobile communication device R4 can be any digital mobile communication device that supports SMS messaging.

Furthermore, a communication device also can be a pager R5 that operates in a paging network 124. The paging network 124 is in communication with the communication network 110 (e.g., the Internet, etc.) and transmits pager notifications via a broadcast radio tower 210. The messaging device R1 can send a pager notification message via the communication network 110 to the paging network 124 for any pager that has a network address.

In one embodiment, the messaging device R1 sends notification messages or alerts to another messaging or communication device that is in communication with the network 110. Those skilled in the art will appreciate that a user may subscribe to tens or hundreds of email accounts (or other messaging accounts), for example. Therefore, instead of learning of new messages by logging into various accounts individually, the user is notified of existing new messages via notification messages sent from a messaging device that initially receives a new message.

In one embodiment, the messaging device R1 may be configured to provide interfaces so that the user can specify settings which causes the device R1 to send a notification to another messaging or communication device for a newly received message. In one embodiment, a user can define settings ("notification preferences") so that a notification is generated and sent for any message that is received. Additionally, in one embodiment, a user can also define settings so that notifications are generated and sent for messages having defined characteristics, such as parameters based on whom the sender is, the amount of time that has elapsed since the message was received and not been opened or viewed, priority settings of the message, etc. Also, a user may configure settings via an interface to establish the type of notification message sent and to what device.

Figure 3A:
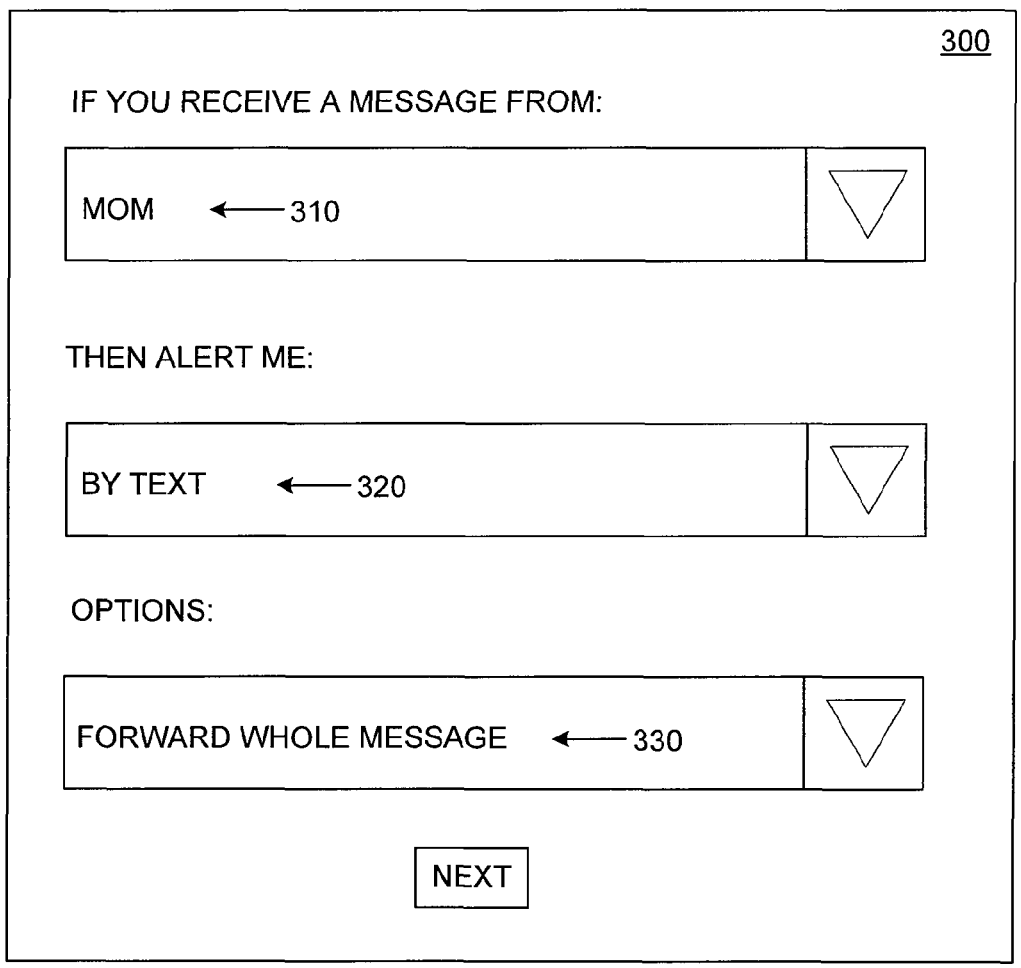
FIGS. 3A-3B are diagrams of exemplary interfaces for configuring settings and/or parameters associated with the system of FIG. 1.

In an exemplary interface, dropdown lists are provided for specifying some of the settings and parameters for notification preferences. For example, a user may select from which senders notification messages are to be generated. According to an exemplary interface 300 shown in FIG. 3A, the user has selected a user identified as "MOM" via a MOM option 310. Also, the user has chosen that he or she desires to be alerted by a text notification messages by selecting a BY TEXT option 320, instead of other types, such as email, for example.

Figure 3B:
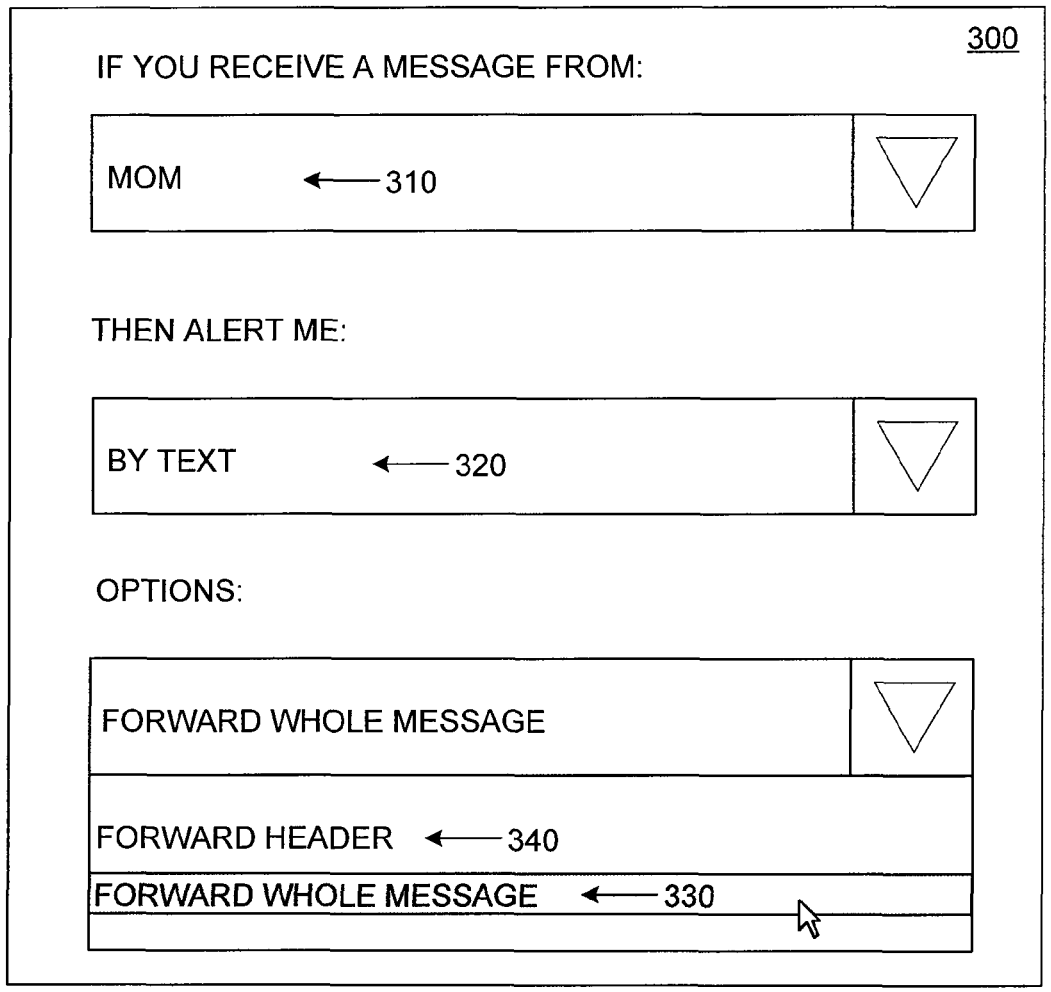

In selecting contents for the notification message as part of notification preferences, a user may also choose to receive a message header and select a FORWARD HEADER option 340, as shown in FIG. 3B. The message header may contain the time and date the message was received, sender identification information, and a subject if one was provided by the sender. Alternatively, other options may be provided such as receiving a copy of contents of the whole message. This option may be selected by choosing a FORWARD WHOLE MESSAGE option 330.

In the case where the notification message is relayed via a gateway device, such as the gateway G, the notification message having contents of the whole message (that is, for example, received at the messaging device R1) is sent to the gateway device G in one format and then converted by the gateway device G to a second format that is used by a secondary network 120. Also, any messages relayed back to the messaging device R1, such as an instructive message or command, may also be transmitted in a format of the secondary network 120, then received by the gateway device G, and converted to a format of the network 110 used by the messaging device R1, where the message is delivered. To facilitate relaying content of messages, an interactive voice response (IVR) system may be employed when notification messages and/or instructive messages are in a voice format and a recipient is to receive the content or deliver instructions.

If the FORWARD WHOLE MESSAGE option 330 is chosen and the type of notification message has been chosen to be a voice message, a phone number where the notification is to be delivered is obtained from the user's profile information which may also be stored in the messaging device R1. Similarly, if the option to deliver a notification message directly to a user's voicemail box is chosen (see FIG. 5), the user's voicemail address may also be obtained from the user's profile information. For example, FIG. 3C shows a portion of an exemplary profile for the user, as displayed by an exemplary interface.

In creating or editing a user profile, a graphical interface 350 of a messaging device, such as the messaging device R1, may provide input boxes so that a user can input requested information. For example, in FIG. 3C, the interface 350 for inputting a portion of profile information is shown. Here, the user can specify an address where text notification messages are to be sent (e.g., 7705552211@text.com) in an input box 355; specify an email address where email notification messages are to be sent (e.g., john@mail.com) in an input box 360; specify an address for sending voice notification messages (e.g., 770-555-2211) in an input box 365; specify an address for sending notification messages in an instant messaging format (e.g., john@im.com) in an input box 370; specify an address for sending a voice notification message directly to a user's voicemail box (e.g., 6785553344@vm.com) in an input box 375, etc.

Figure 4:
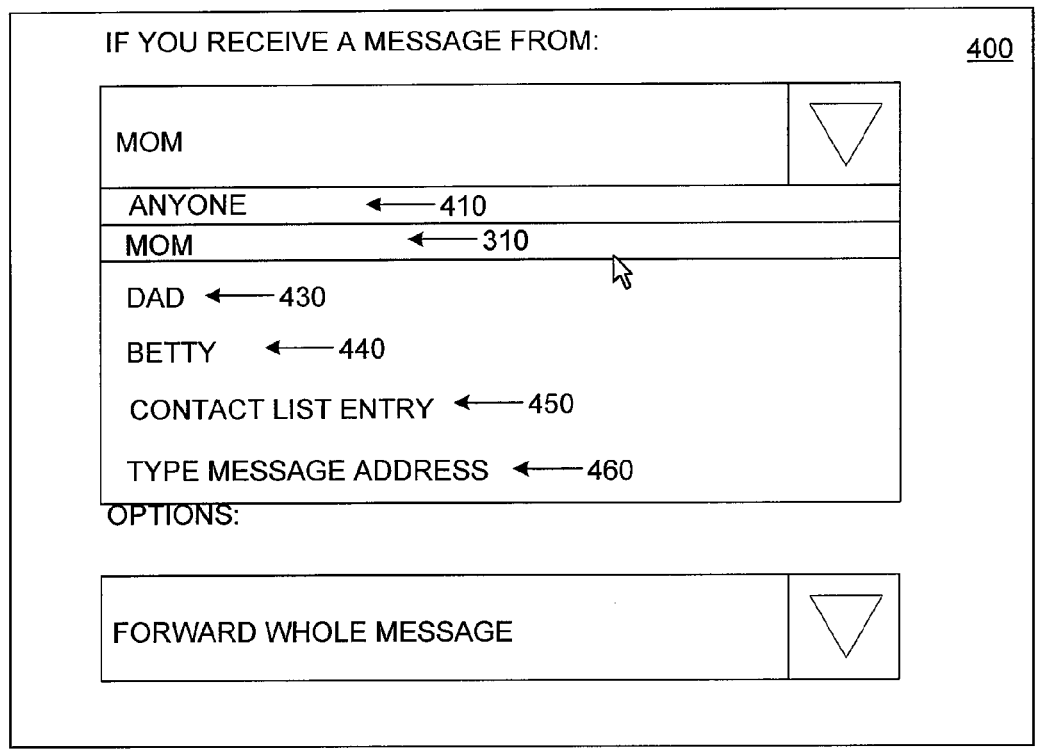
FIGS. 4-5 are diagrams of exemplary interfaces for configuring settings and/or parameters associated with the system of FIG. 1.

As discussed above, a user may be provided an option of being notified about messages received from particular senders. In selecting a sender (e.g., "MOM"), the user may be provided a list of options from which to choose. In an exemplary interface 400 of FIG. 4, the user is provided the option of being notified of messages received from anyone via an ANYONE option 410 (e.g., any sender of a new message received by device or inbox). Further, the user is provided options of choosing individual senders, such as Mom via the MOM option 310, Dad via a DAD option 430, Betty via a BETTY option 440, etc. Also, the user may choose the option of sending notification messages for any sender that is an entry on a contact list, i.e. a CONTACT LIST ENTRY option 450. In some embodiments, an entry on an address book or a distribution list may also be provided as an option. Further, the user may manually type in a sender's address by selecting a TYPE MESSAGE ADDRESS option 460.

In some embodiments, messages are accessed through a messaging program configured for use on a specific computer or messaging device, such as the messaging device R1. In others, a Webmail or Web messaging application allows a user to access a messaging account on a Web page, using a Web browser. In this way, a user can read, send, and organize messages on their Web-based inbox on any computer or device that has a Web browser. In accordance with the present disclosure, a Web server hosting the Web-based inbox may be configured to operate the disclosed methods and operations herein.

Figure 5:
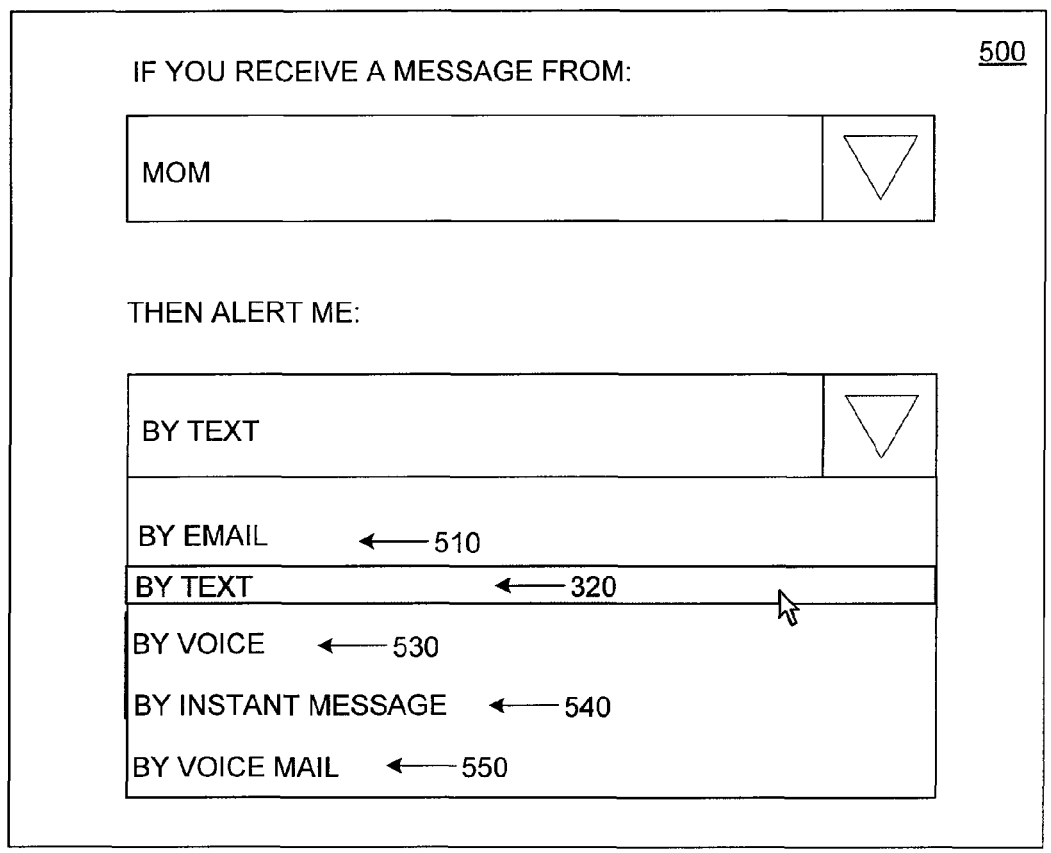

In selecting a notification message format or location of delivery, a user may also choose to send a notification via email by selecting a BY EMAIL option 510, via text by selecting the BY TEXT option 320, via voice by selecting a BY VOICE option 530, via instant message by selecting a BY INSTANT MESSAGE option 540, or via voice mail by selecting a BY VOICE MAIL option 550 for example, as shown in an interface 500 of FIG. 5. Accordingly, a user profile containing the email address to be used for the notification message may be maintained by a recipient device, such as the messaging device R1, if the BY EMAIL option 510 is chosen, in order to address the notification message. Accordingly, the user profile may also contain an SMS address for the BY TEXT option 320 and a telephone number for the BY VOICE option 530, to be used for a notification message. Further, the user profile may contain an address for the gateway to be used in delivering notification messages to external networks, such as a wireless cellular network or land-line PSTN network for the BY TEXT option 320 or the BY VOICE option 530 or by delivery of notification messages to a voice mail box via selection of the BY VOICE MAIL option 550.

The communication network 110 may be any type of network employing any network topology, transmission medium, or network protocol. For example, such a network may be any public or private packet-switched or other data network or any other desired communications infrastructure and/or combination of infrastructure. In one embodiment, the communication network 110 is configured as the Internet and includes servers 140 (only one shown for simplicity) for processing services such as instant messaging and email, among others, as shown in FIG. 1.

According to exemplary embodiments, the messaging device R1 includes client applications (which may be referred to as client or clients) that can be implemented in software (e.g., programming stored on a medium, firmware, etc.), hardware, or a combination thereof. In some embodiments, the client applications are implemented in software as an executable program, and executed by a special or general purpose digital computer, such as a personal computer (PC; IBM-compatible, Apple-compatible, or otherwise), workstation, minicomputer, or mainframe computer.

Figure 6:
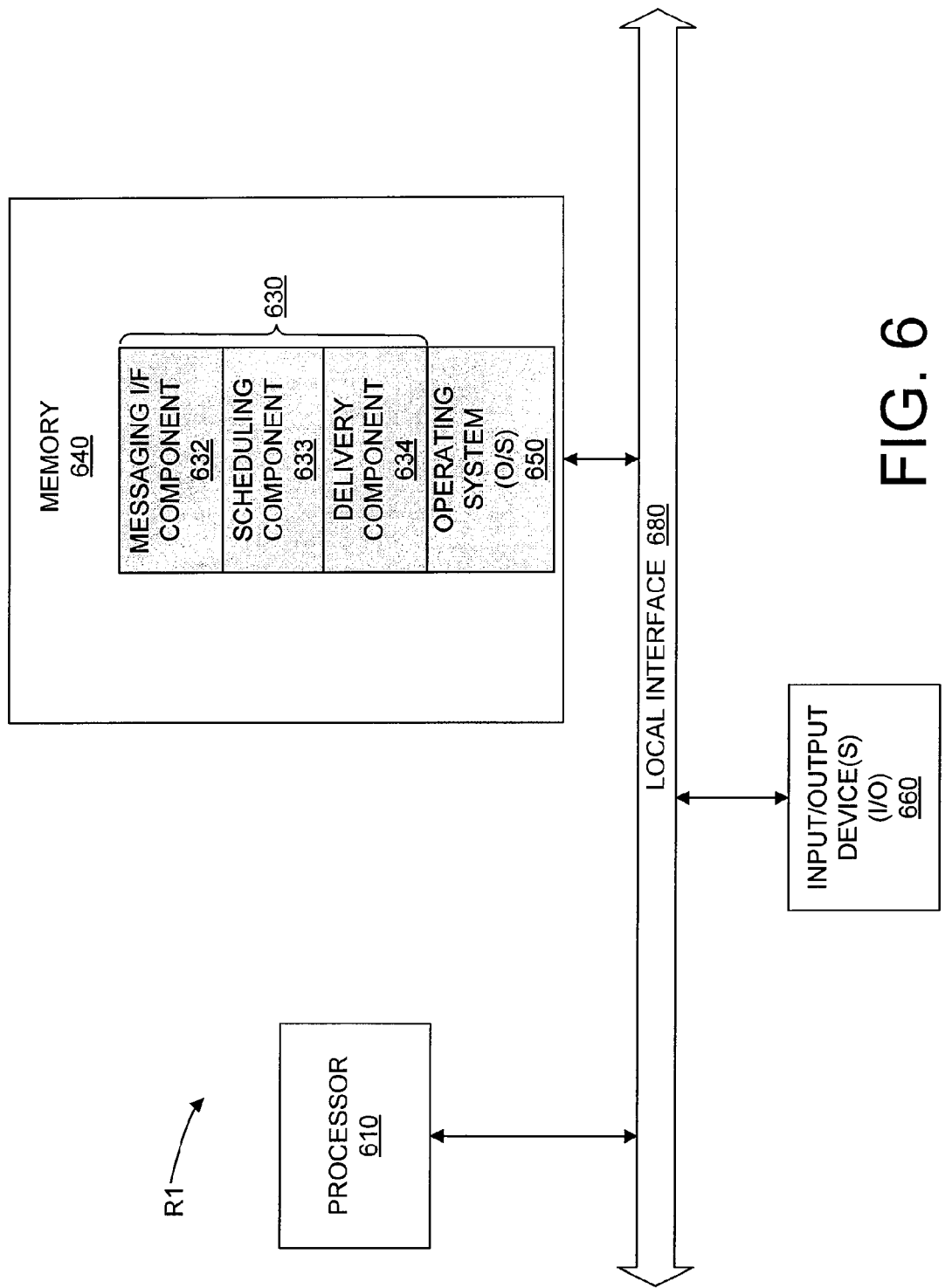
FIG. 6 is a block diagram of a messaging device, such as that featured in the system of FIG. 1.

According to exemplary embodiments, in terms of hardware architecture, the messaging device R1 includes, inter alia, a processor 610 and memory 640, as illustrated in FIG. 6. Input and/or output (I/O) devices 660 (or peripherals) can be communicatively coupled to a local interface 680, as further shown in FIG. 6. The local interface 680 can be, for example but not limited to, one or more buses or other wired or wireless connections, as is known in the art. The local interface 680 may have additional elements, which are omitted for simplicity, such as controllers, buffers (caches), drivers, repeaters, and receivers, to enable communications. Further, the local interface 680 may include address, control, and/or data connections to enable appropriate communications among the aforementioned components.

The I/O devices 660 may include input devices, for example but not limited to, a keyboard, mouse, scanner, microphone, etc. Furthermore, the I/O devices 660 may also include output devices, for example but not limited to, a printer, display, etc. Finally, the I/O devices 660 may further include devices that communicate both inputs and outputs to the network 110, for instance but not limited to, a modulator/demodulator (modem; for accessing another device, system, or network), a radio frequency (RF) or other transceiver, a telephonic interface, a bridge, a router, etc.

The processor 610 is, according to exemplary embodiments, a hardware device for executing software, particularly that stored in the memory 640. The processor 610 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The memory 640 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 640 may incorporate electronic, magnetic, optical, and/or other types of storage media. Note that the memory 640 can have a distributed architecture, where various components are situated remote from one another, but can be accessed by the processor 610.

Software and/or firmware in the memory 640 may include one or more separate programs, each of which comprises an ordered listing of executable instructions for implementing logical tasks. In the example of FIG. 6, the software in the memory 640 includes programming for sending notification messages 630 ("notification application"), and a suitable operating system (O/S) 650. The operating system 650 controls the execution of other computer programs, and provides scheduling, input-output control, file and data management, memory management, and communication control and related services. According to exemplary embodiments, the notification application 630 includes components involved in providing interfaces for configuring notification parameters and delivering notification messages. In one embodiment, a messaging interface component 632 provides graphical interfaces, a scheduling component 633 sets triggering events, and a delivery component 634 delivers notification messages, among others, as described in the present disclosure.

In one embodiment, the messaging devices R1, R2 are adapted to handle normal email functions, such as composing messages, replying to received messages, sending messages, saving messages, deleting messages, etc. The messaging device R1 includes software applications that assist a user in communicating with other persons having messaging devices, such as the messaging devices S, R2.

In addition to characterizing new messages by sender information, messages may be characterized by the amount of time that has elapsed since the new message was received. By specifying a window of time in which a newly received message has not been opened, a user can identify, in a different way, new messages for which notifications are to be sent. For example, the user can specify a two hour time limit such that if a new message is received by the messaging device R1 and/or not opened, attended, or viewed by the user within the two hour time limit, then a timeout occurs and a notification is sent to the user's other messaging device R2, R3. In general, a timeout is a period of time after which a condition is raised if some event has not occurred. Different amounts of time may be specified by the user to trigger a notification.

Figure 7:
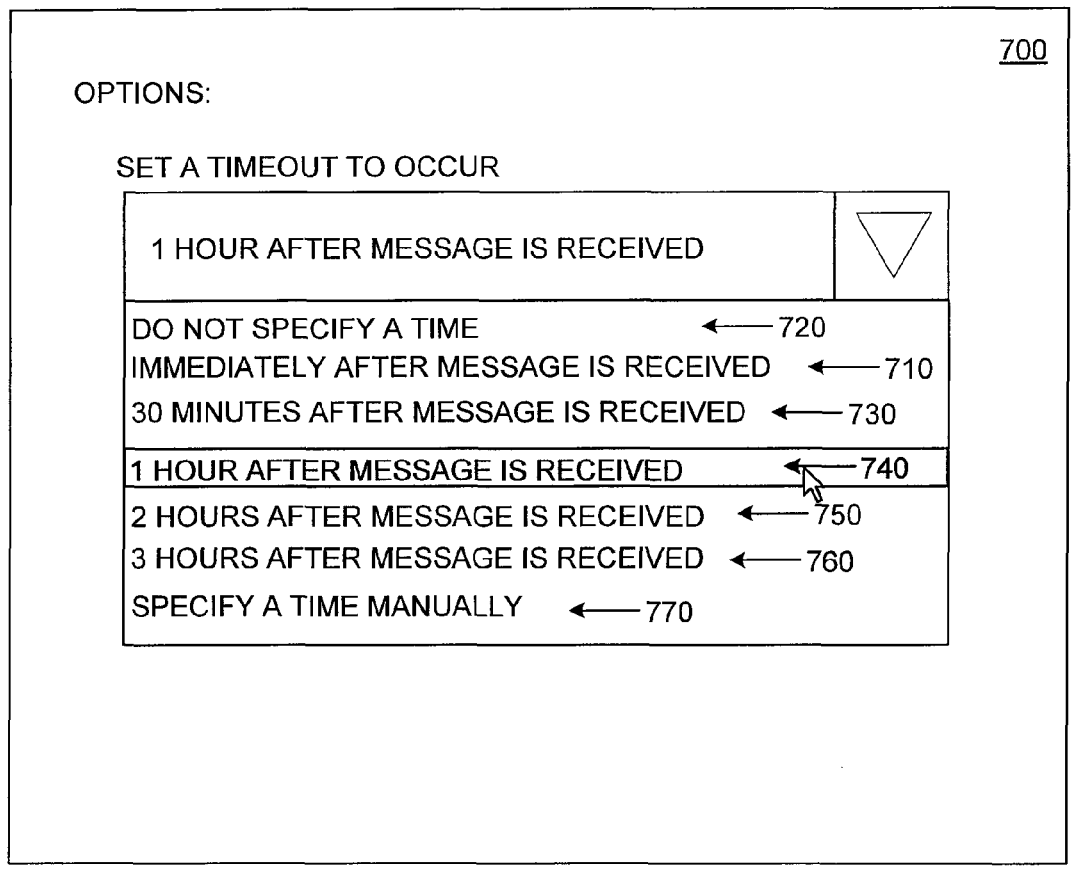
FIGS. 7-9 are diagrams of exemplary interfaces for configuring settings and/or parameters associated with the system of FIG. 1.

To specify a time at which a trigger (e.g., act of sending a notification message) should occur, in one embodiment, the messaging device R1 may provide a graphical interface 700 having a dropdown list of options, as illustrated in FIG. 7. The options may include different time ranges. For example, if a user desires transmission of a notification message to be triggered (e.g., caused to be sent) right after a message is received then an IMMEDIATELY AFTER MESSAGE IS RECEIVED option 710 may be selected, as shown in FIG. 7. In contrast, if a user does not desire the triggering of a notification message to be sent based upon a time limit, then a DO NOT SPECIFY A TIMEOUT option 720 may be selected.

Further, a 30 MINUTES AFTER MESSAGE IS RECEIVED option 730 provides for a trigger to occur if the message has not been opened within 30 minutes of the message being received by the messaging device R1. 1 HOUR AFTER MESSAGE IS RECEIVED, 2 HOURS AFTER MESSAGE IS RECEIVED, and 3 HOURS AFTER MESSAGE IS RECEIVED options 740, 750, 760, perform in a similar fashion. Also, a user may manually input a length of time before the triggering of a notification message by selecting a SPECIFY A TIME MANUALLY option 770.

Figure 8:
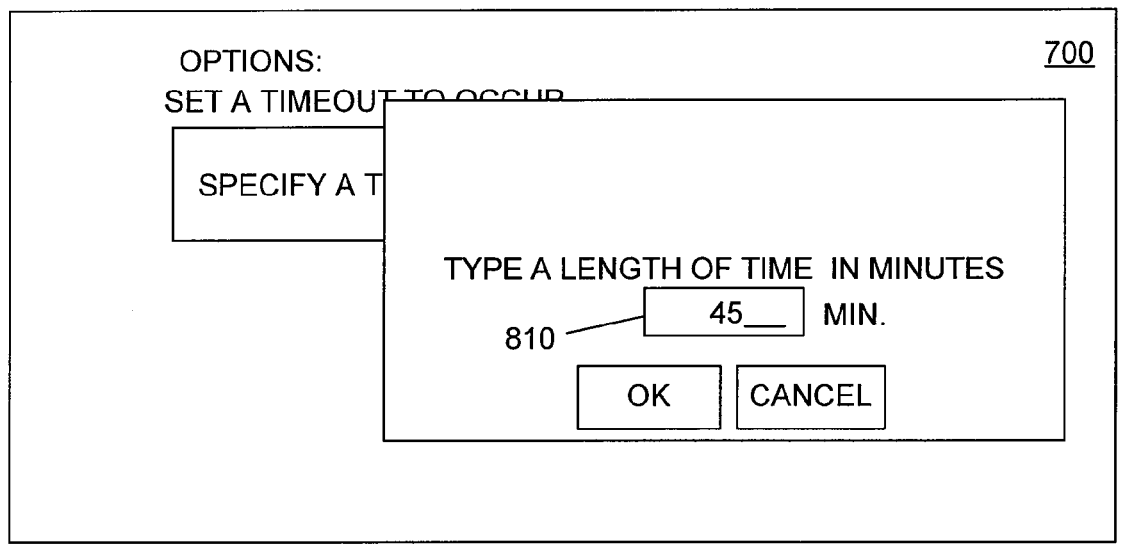

In such a case, an input box 810 may be provided (in response to selection of the option 770), as illustrated in FIG. 8, so that the user may type a desired length of time in minutes, in one embodiment.

In a similar manner, high-priority tags caused to be attached to a message by a sender may be taken into account in determining a triggering event for sending a notification message. In general, a triggering event is an action or occurrence detected by the notification application 630 which may cause for transmission of a notification message by the application.

In one embodiment, a graphical interface 910 of a messaging device, such as the messaging device R1, may provide a dropdown list 920 where a user can choose to consider high-priority tags which are often represented by messaging applications as an exclamation point (see icon 1070 of FIG. 10) or a flag, within a displayed message. In general, a priority tag can be placed on an email to alert the email recipient to the importance that the mail be read or opened. Different choices may be available for these tags, such as low, normal, or high (see item 1394 of FIG. 13B). A message priority tag setting is displayed to a recipient and allows him or her to know the importance the sender places on the recipient reading the message.

Figure 9:
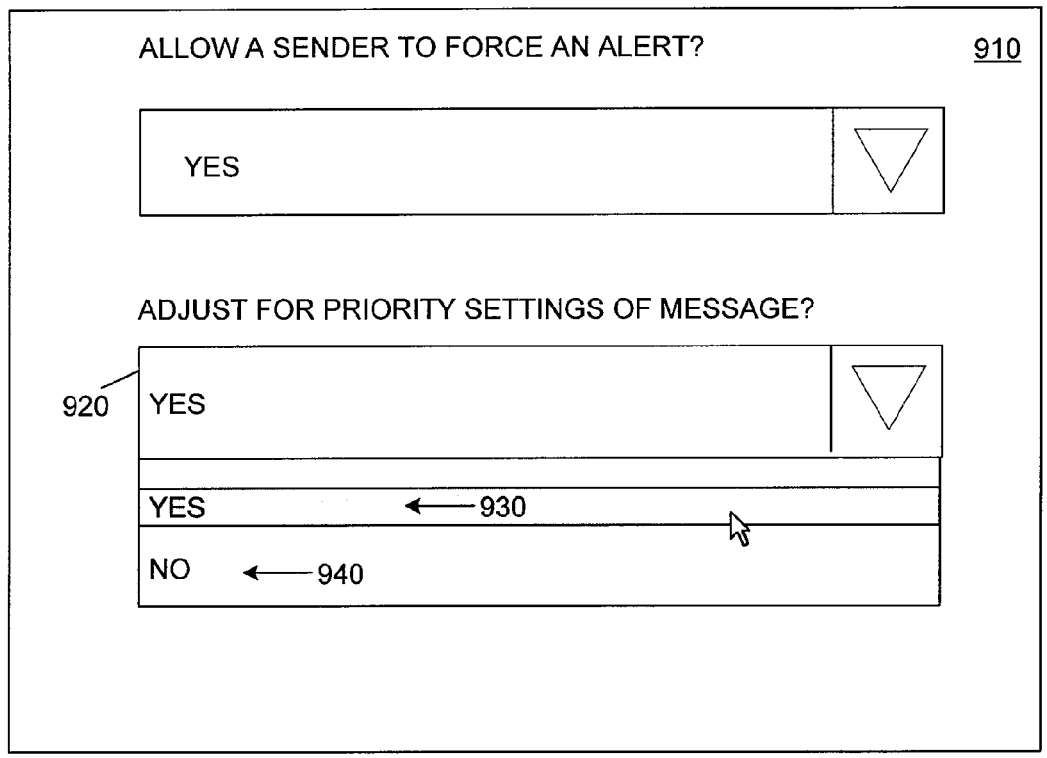

In FIG. 9, the exemplary dropdown list 920 is shown. If a user desires to consider and account for high-priority tags in a message when determining whether a notification message be sent, the user can choose to select a YES option 930. If, however, the user does not desire to consider and account for high-priority tags in a message, the user can choose to select a NO option 940.

If the user selects the YES option 930 and the user has defined an event for triggering a notification message, then a message that is received having a high-priority tag causes a notification message to be sent immediately regardless of whether the user's defined triggering event has occurred or not. In this way, important and critical messages may cause notification messages to be sent to the recipient so that the recipient can be aware of these messages promptly.

In one embodiment, a triggering event may be subject to a level of importance or priority assigned to a message by the sender. For example, if a sender tags a message as being of high priority and sends the message to a user, where the messaging device receives the message, a time trigger imposed by the user may be overridden by the urgent nature of the message (as indicated by the high-priority tag). In other words, the user may specify, via interface windows, that a timeout period or window (e.g., three hours) is subject to a high-priority tag of a received message. Therefore, if the messaging device R1 receives a message not having a high-priority tag, the messaging device R1 will wait a designated amount of time (e.g., three hours) to determine whether a notification should be sent regarding the newly received message. However, if the messaging device R1 receives a new message having a high-priority tag (e.g., a sender-indicated priority), the client device will immediately determine whether a notification should be sent and not wait the specified window of time (e.g., three hours) before triggering a notification. Likewise, a user could specify that a new message received from a certain sender could take priority over a timeout window used for a triggering event.

Figure 10:
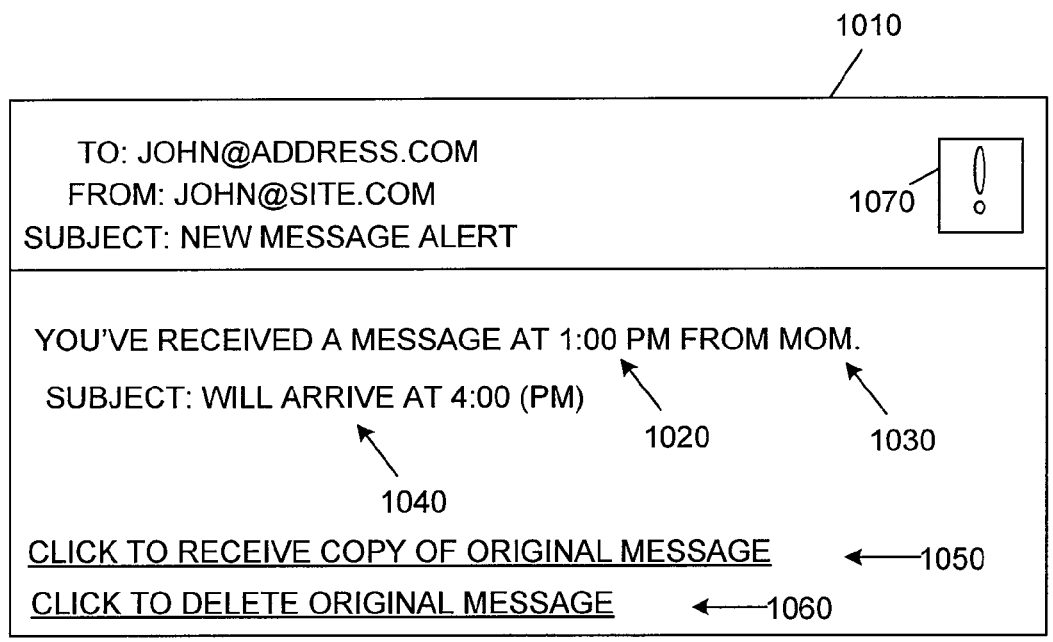
FIG. 10 is a diagram of an exemplary notification message, such as that generated by the messaging device of FIG. 6.

An exemplary notification message 1010 is shown in FIG. 10. In this example, the notification message 1010 is shown as an email message as would be viewed on the messaging device R1. The notification message 1010 indicates to the recipient that "You've received a message at 1:00 P.M. from Mom. Subject: Will Arrive at 4:00 (PM)." Therefore a time at which the original message was received 1020 and a sender of the original message 1030 are identified in the notification message 1010. Also, text from the subject field of the original message 1040 is also provided in the notification message 1010. The notification message 1010 also contains links 1050, 1060 that allow the recipient to instruct the messaging device R1 that received the message on different courses of actions.

For example, if the recipient selects the "Click to receive contents of original message" link 1050, then an instructive message or command will be sent from the messaging device R2, R3 that received the notification message back to the messaging device R1 that received the original message with instructions to send contents of the original message to the messaging device R2, R3 so that the recipient may view the entire contents. The messaging device R1 will receive, interpret, and execute the instructions via the notification application 630. If the recipient selects the "Click to delete original message" link 1060, then an instructive message or command will be sent from the messaging device R2, R3 that received the notification message back to the messaging device R1 that received the original message with instructions to delete the original new message from the user's inbox on the messaging device R1. The messaging device R1 will receive, interpret, and execute the instructions via the notification application 630.

For instance, from a notification message, the user may determine that the original message does not need to be maintained in the user's inbox. Therefore, an option may be provided in the notification message to delete the message from the user's inbox. Such options may also be provided as a voice message to a user receiving the notification from a cellular or PSTN telephone. Accordingly, an IVR system for a telephone network may be used to relay voice commands to the user.

Figure 11:
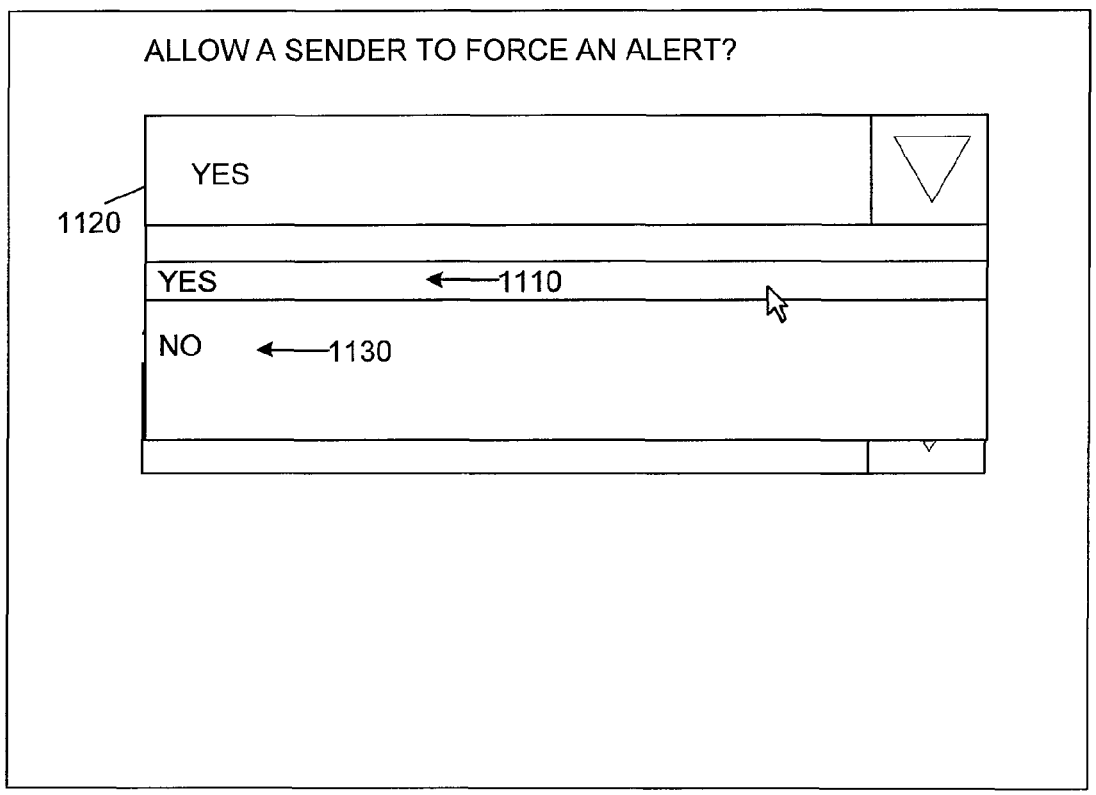
FIGS. 11-15 are diagrams of exemplary interfaces for configuring settings and/or parameters associated with the system of FIG. 1.

In some embodiments, a sender may request a sender-forced trigger for transmission of a notification message to the recipient. Accordingly, in anticipation of such a request, a potential recipient of such a notification message can configure settings to automatically grant or deny such a request. In one embodiment, the messaging device R1 of the potential recipient or user provides a graphical interface having a dropdown list 1120 to select an option for allowing or disallowing a request for a sender-forced trigger, as shown in FIG. 11. If the user would grant such a request, the user can select a YES option 1110 from the dropdown list 1120. However, if the user would prefer to deny such a request, the user can select a NO option 1130 from the dropdown list 1120.

Figure 12:
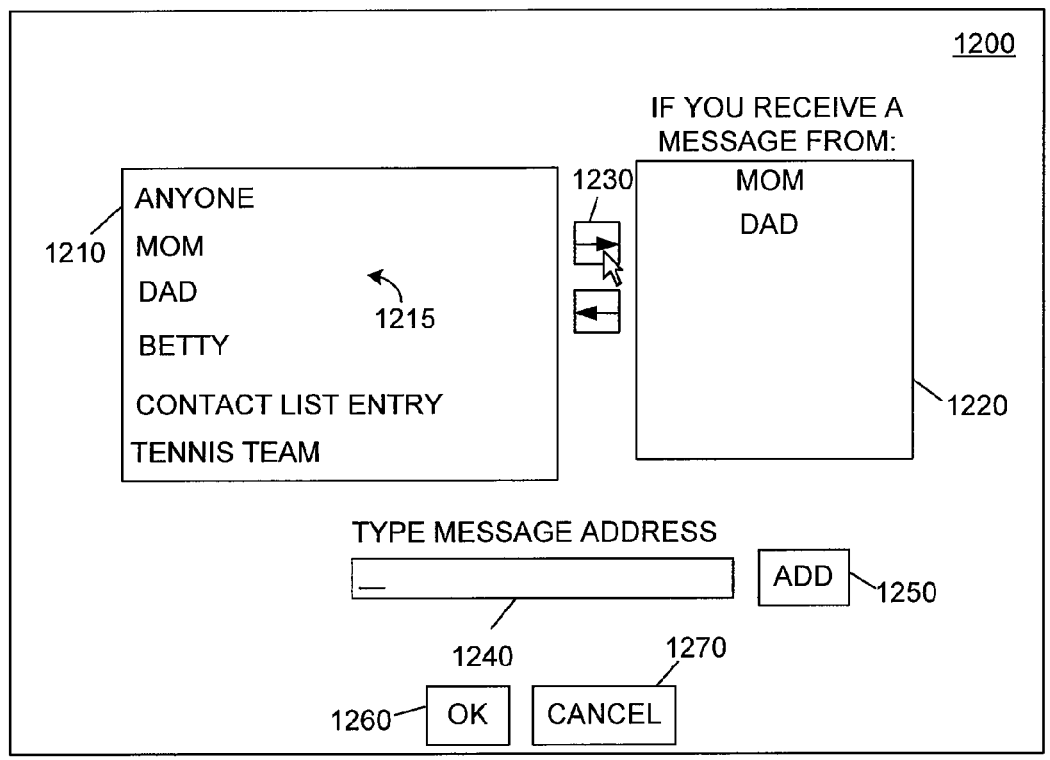

To specify senders whose sender-forced trigger requests will be granted by the messaging device, a graphical interface may also be provided by the messaging device R1. As shown in an exemplary interface 1200 of FIG. 12, a user may choose from a list of contacts 1215 in a left pane 1210 of the interface and move selected contacts to a right pane 1220 by selecting an arrow button 1230. Contacts in the right pane 1220 are being designated for an allow list of senders whose request for a sender-forced trigger is to be automatically granted by the messaging device R1.

In general, contacts are a repository of people or companies that have information stored about them. Name, phone number, and messaging address are an example of some fields that can be stored about each contact. The contacts 1215 provided in the left pane 1210 may be obtained from a user's contact list, address book, distribution lists, etc. Further, a user may input a contact address by typing the address into an input box 1240 and then selecting an ADD button 1250. This causes the address to be added to the right pane 1220.

After the user has added all the desired contacts and/or addresses to the right pane 1220, then the user may select an OK button 1260 to identify senders whose requests for a sender-forced trigger will be granted. Otherwise, the user may select a CANCEL button 1270 to close the interface window without making any changes.

Figure 13A:
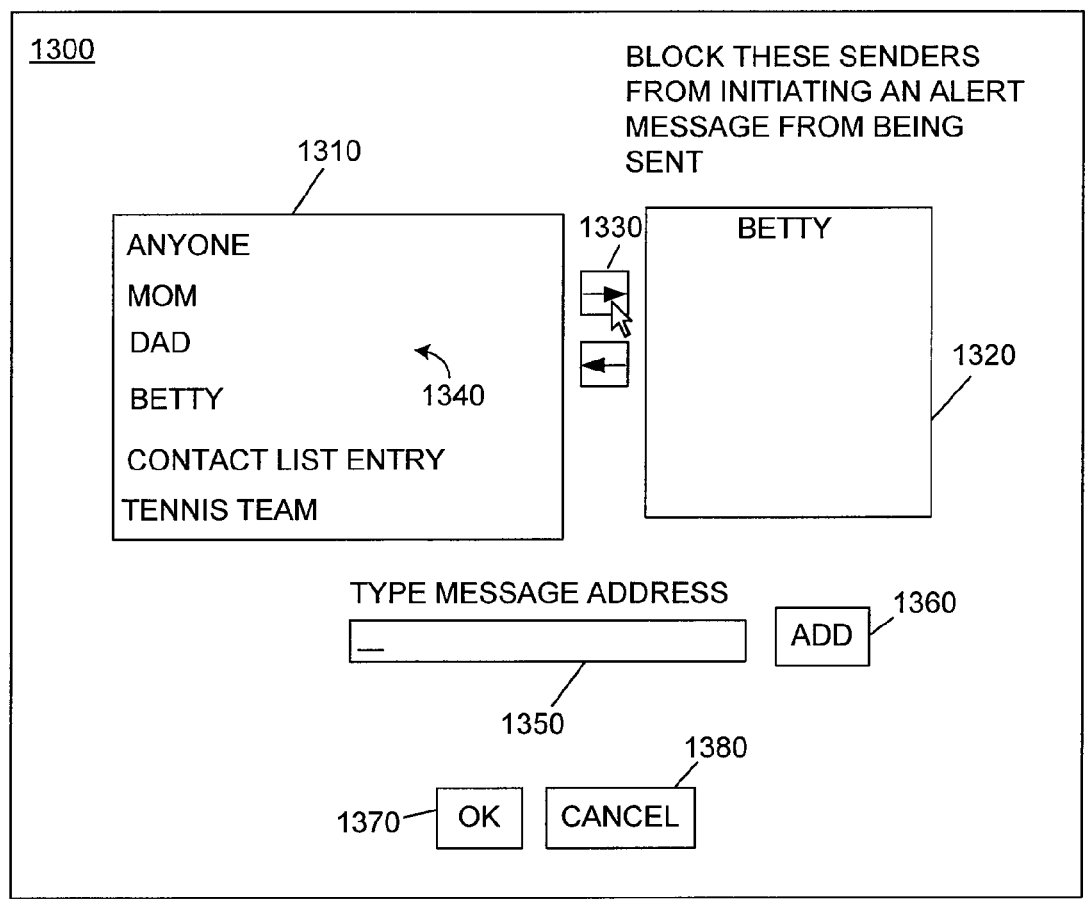

To specify senders whose sender-forced trigger requests will be denied by the messaging device R1, a graphical interface may also be provide by the messaging device R1. As shown in an exemplary interface 1300 of FIG. 13A, a user may choose from a list of contacts 1340 in a left pane 1310 and move selected contacts to a right pane 1320 by selecting an arrow button 1330. The contacts 1340 provided in the left pane 1310 may be obtained from a user's contact list, address book, distribution lists, etc. Further, a user may input a contact address by typing the address into an input box 1350 and then selecting an ADD button 1360. This causes the address to be added to the right pane 1320. Contacts in the right pane 1320 are being designated for a block list of senders whose request for a sender-forced trigger is to be automatically denied by messaging device R1.

After the user has added all the desired contacts and/or addresses to the right pane 1320, then the user may select an OK button 1370 to identify senders whose requests for sender-forced notification will be denied. This list of senders may be referred as a block list. Otherwise, the user may select a CANCEL button 1380 to close the interface window without making any changes.

In this way, the user can enable a sender to receive notifications regarding a message sent from the sender. For example, from the outset, a sender may know that an intended recipient of a message is away from his or her messaging device R1 and inbox. Therefore, the sender may desire to have a notification message sent to the recipient when the messaging device R1 receives the message, in place of any notification settings set by the user, such as a three-hour window.

Figure 13B:
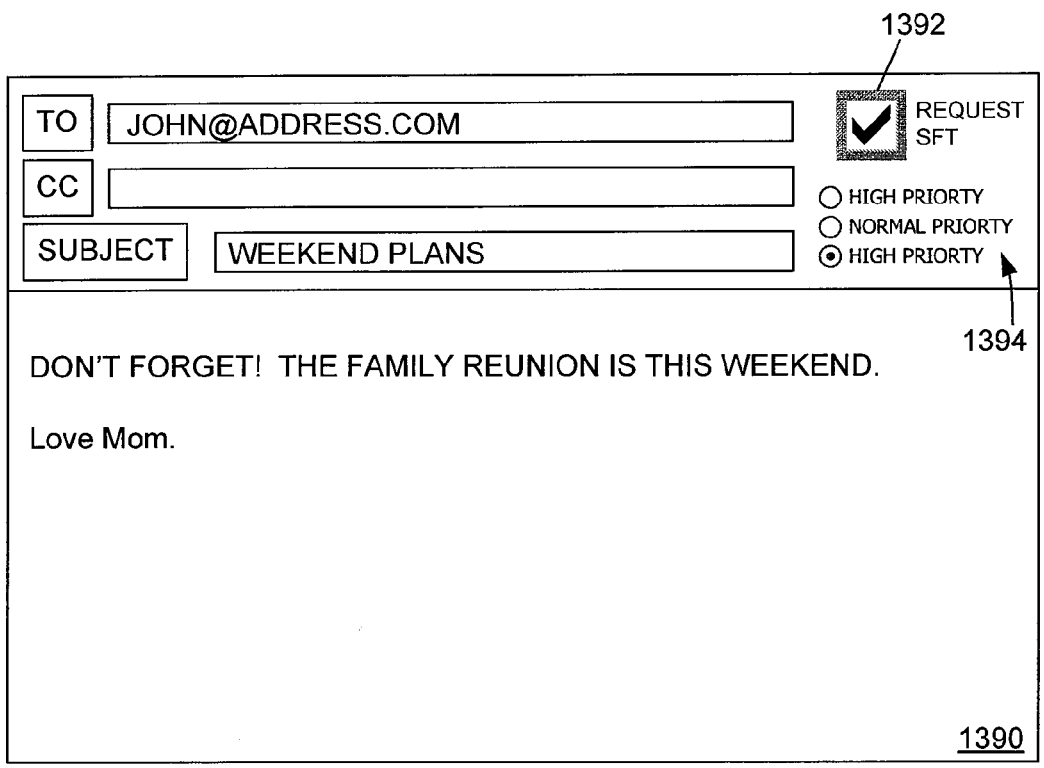

In one embodiment, the messaging device S of a sender thus provides an interface window 1390 to be used in composing a message, as shown in FIG. 13B. Within the interface window 1390, the sender can select a checkbox 1392 to indicate that a notification is desired to be sent to the recipient and a request for a sender-forced trigger (SFT) is contained. Therefore, in generating the message, the sender's messaging device S may add a tag to the message to indicate that a sender-forced trigger is requested. Accordingly, when the recipient's messaging device R1 receives the message, the messaging device will check for the tag which indicates a request for a sender-forced trigger. If the tag is detected, then the settings on the recipient's messaging device R1 are checked to determine whether the recipient has enabled a sender-forced notification to be generated. If so, the notification is generated and sent to the recipient, in accordance with the parameters defined by the recipient on the messaging device R1 as to where the recipient would like the message delivered, but in accordance to parameters specified by the sender as to when the notification should be sent. For example, a recipient may specify a timeout window of three hours and if a message is received and unattended for three hours, then generation and transmission of a notification is triggered. However, the recipient may also enable a sender to force a notification trigger. Accordingly, a sender in composing a message may request that a notification be sent after two hours of receipt of the message if the message has not been viewed by the recipient.

FIG. 13C shows a portion of an message header 1395 that includes header tag(s) 1396 representing the request for a sender-forced notification to be sent after two hours if the message has not been viewed by the recipient. As shown by FIG. 13C, an "X-SENDER-FORCED REQUEST" tag has a "YES" parameter to indicate that a sender-forced trigger request is included with the message also. An "X-TIME PERIOD" tag has a "120" parameter associated with it to indicate that a 120 minute or 2-hour time period or window is also part of the request.

In one embodiment, the sender's ability to force a notification to be sent is contingent on the recipient allowing senders to have access to this alternative method of notification. Even if a sender adds a tag to request a sender-forced trigger, it may not trigger an alternate notification if the recipient has not enabled his or her messaging device to allow such a feature. Also, in some embodiments, while a recipient may enable this type of feature, the recipient may also have a block list of senders that are not allowed to access the feature. Alternatively, the recipient may have an allow list of senders that are the only ones authorized to access the feature. In various embodiments, allow and block lists may also be employed for different features associated with message notifications.

It is also noted that in one embodiment a recipient may not designate any notification parameters (but still allow for a sender-forced notification back to the sender). Accordingly, if a sender desires to know whether a sent message was opened within two hours or not, the sender can send the message with a sender-forced notification tag indicating a time limit, then if a timeout occurs (e.g., the message is received and not opened by the expiration of the time limit), then the sender is notified by the recipient's messaging device. This is distinct from a notification that is sent to a recipient. In some embodiments, after a triggering event occurs, a notification may be sent to the recipient to alert the recipient of a new message and a notification may be sent to the sender to alert the sender that a message has yet to be viewed or read by the recipient.

Another aspect of various embodiments is that a response to the request for sender-forced trigger may be transmitted to the sender from the recipient's messaging device R1. Therefore, if the recipient's messaging device R1 allows for the sender-forced trigger to be set, the recipient's messaging device R1 may send a follow up response to the sender's messaging device S notifying the sender that the notification was set. Also, if the recipient's messaging device R1 prohibited the sender-forced notification to be generated, the recipient's messaging device R1 may send a follow up response to the sender's messaging device S notifying the sender's messaging device S that the request was not granted.

Also, in one embodiment, among others, a hierarchy of triggering events may be defined by a user. In other words, the order in which types of triggering events should be considered by the messaging device R1 are definable by a user and the parameters used to trigger notifications may take precedence over one another. In this way, a fluid hierarchy for determining whether or not to send notifications can be established, based upon user settings and parameters.

Figure 14:
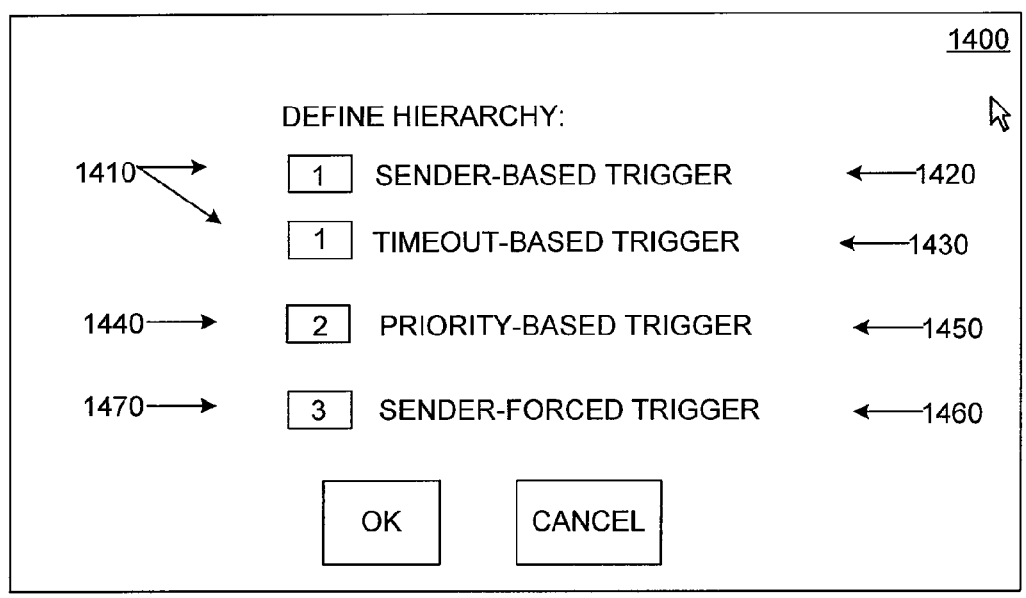

In FIG. 14, an exemplary interface 1400 is provided where a user can input the order in which different types of triggering events are to be considered by the messaging device R1. In the present example, the user has assigned a highest priority of "1" 1410 to a sender-based trigger 1420 and also to a timeout-based trigger 1430. A priority-based trigger 1450 has been assigned a next highest priority level ("2") 1440 and a sender-forced trigger 1460 has been assigned a third highest priority level ("3") 1470.

In view of the priority levels selected as illustrated in FIG. 14, assume that a message is received having a high-priority tag and a request for a sender-forced notification. Also, assume that the recipient of the new message has configured settings on the messaging device R1 to define particular senders that the user would like to receive notifications. Also, assume that the user has defined a time range or window after which a newly received message that has not been viewed should cause a notification message to be sent.

In accordance with the above assigned priority levels, the newly received message will cause a notification message to be sent if the sender is authorized by the user and if the time range or window is satisfied, since both have the highest priority level of 1 1410. Therefore, if these two conditions are met, a newly received message will cause a notification message to be sent in accordance with the associated settings and parameters. In the above example, these two conditions are met, so the messaging device R1 sends a notification message if the received message is not viewed by the time the time range elapses (e.g., a timeout occurs).

Now, if a newly received message is not from a sender on an allow list for example and if the user has not set a timeout trigger via an interface of the messaging device R1, then a notification message for the newly received message is sent immediately if a high-priority tag is contained in the received message, since the priority-based trigger 1450 has been assigned the next highest priority level of 2 1440.

Likewise, if a newly received message is not from a sender on an allow list for example and the user has not defined a time range via an interface of the messaging device R1 and a high-priority tag is not included in the new message, the messaging device R1 considers whether a request for a sender-forced trigger is included in the message in order to determine if and when a notification message should be sent, since a sender-forced trigger 1460 has been assigned the third highest priority level ("3") 1470 and is considered last by the messaging device R1.

Figure 15:
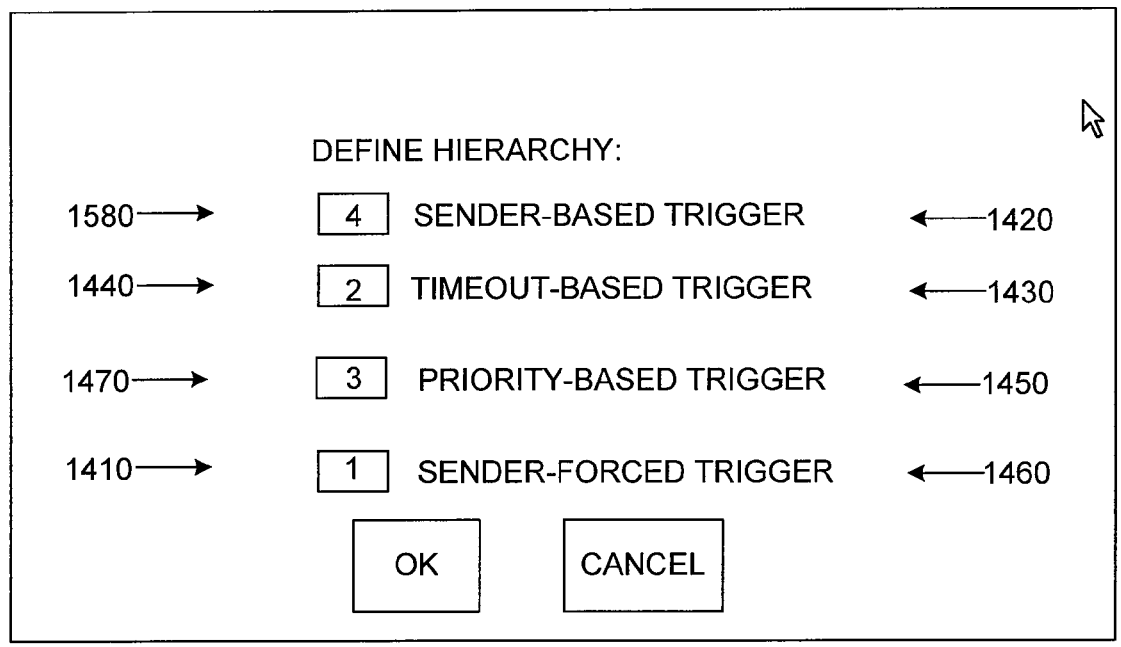

In another example, as shown in FIG. 15, assume a user has assigned the highest priority of "1" 1410 to the sender-forced trigger 1460. Also assume the timeout-based trigger 1430 has been assigned the next highest priority level ("2") 1440; the priority-based trigger 1450 has been assigned the third highest priority level ("3") 1470; and the sender-based trigger 1420 has been assigned a fourth highest priority level ("4") 1580.

Therefore, consider if a message is received having a high-priority tag and a request for a sender-forced notification; the recipient of the message has also configured settings on the messaging device R1 to define particular senders (allow list) that the user would like to receive notifications; and the user also has defined a time range after which a newly received message that has not been viewed should cause a notification message to be sent.

In accordance with the above assigned priority levels, the newly received message will cause a notification message to be sent immediately since the message contains a request for a sender-forced trigger and the associated priority level or ranking is the highest.

If the message did not contain such a request, then a notification would be sent by the messaging device after the user-designated time range had elapsed assuming that the user has not viewed the message within that time range, since the priority for a timeout trigger is at the next highest level 1440. If the user had viewed the message during the time range, then the notification would not be sent by the messaging device.

However, if the message did not contain a request for a sender-forced trigger (which is assigned the highest priority level 1410) and the user had not set a timeout (which is associated with the next highest priority level 1440), then the notification would be sent immediately by the messaging device if the message contained a high-priority tag. Otherwise, if the message did not contain a request for a sender-forced request, the user had not provided a time range, and the message did not contain a high-priority tag, then a notification message may be sent if the sender of the message was designated and identified by the user as a sender that should cause a notification message to be generated and transmitted (which is associated with the next highest priority level).

Further, in some embodiments, a user may not assign a number or level to a triggering event. If this occurs, then the triggering event that is not assigned a value is not to be considered by the notification application 630 in determining if and when a notification is sent.

In one embodiment, to manage notification events, the notification application 630 establishes a notification schedule. The notification application 630 utilizes the information in the notification schedule to determine a periodic interval for checking triggering events associated with a new message to determine if one of the events indicates that a notification message should be sent. When a user views a new message, the triggering events associated with the new message are removed from the notification schedule, since a notification is no longer needed. Likewise, after a notification message has been sent for a new message, the triggering events associated with the new message are also removed from the schedule.

The notification message can include a variety of information to inform the user that there is a new email message waiting at a specific messaging device, such as the messaging device R1, or inbox. The notification message can include, for example, any or all of the information contained in the email message header to notify the user.

According to exemplary embodiments, the user is notified only when new email messages are found at the messaging device R1 or inbox during periodic scheduled checks or checks performed upon receipt of a new message and will not be repeatedly notified of the same email messages.

The new message that is received by the messaging device R1 is not affected by the generation and transmission of a notification, according to exemplary embodiments. The new message is delivered to the messaging device R1 or inbox, as intended by the sender. However, the user may implement settings that allow the user to remotely manage the message from afar. For example, the user may configure settings, via interface windows of the messaging device R1, that provide for handling options to be provided in a notification message.

As previously mentioned, within the communication network 110, the messaging device S of a user referred to as a sender may send a message to another user, referred to as a recipient. When the messaging device R1 of the recipient receives the message, the messaging device R1 may then send a notification message to another messaging device R2 of the recipient. The server device 140 may be used to relay messages between the sender and recipient devices.

Figure 16:
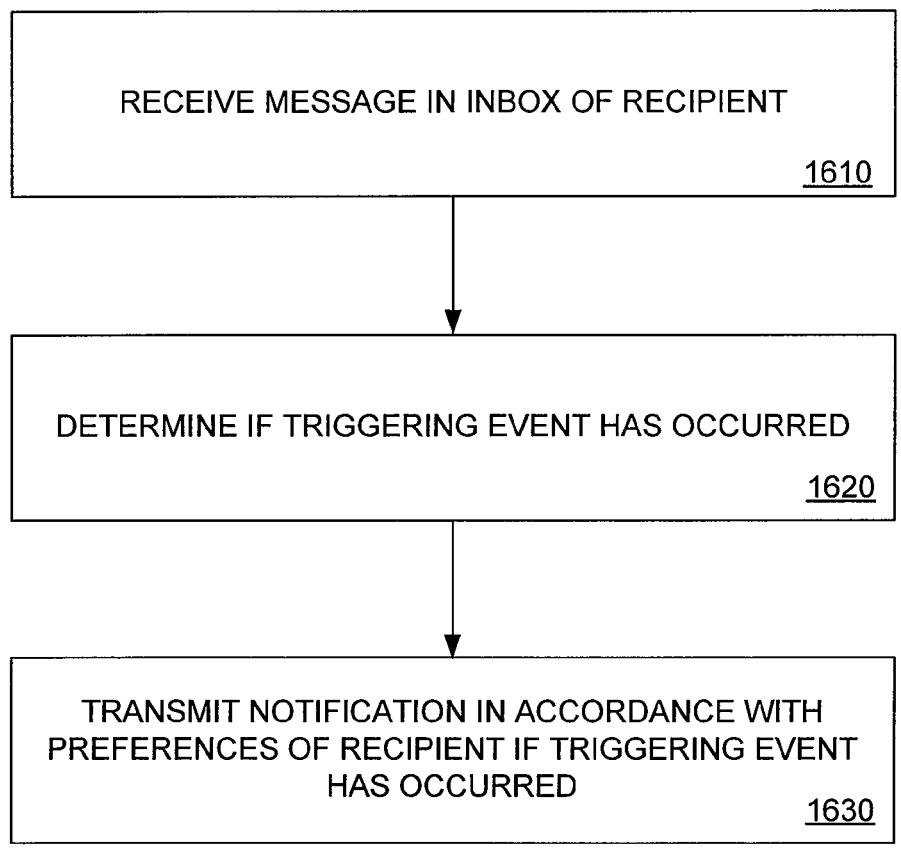
FIGS. 16-17 are flow chart diagrams illustrating various embodiments of methods of message notification in accordance with the present disclosure.

As shown in the flow chart of FIG. 16, one embodiment of a method of message notification includes receiving (1610) a message at an inbox of a recipient on the messaging device R1. The messaging device R1, after receiving the message, determines (1620) whether a triggering event has occurred which prompts the transmission of a notification message announcing the arrival of the new message to another inbox of the recipient. If a triggering event has occurred for the new message, a notification message is generated and transmitted (1630) in accordance with alert or notification preferences designated by the recipient. Different sets of preferences may be designated for particular senders or contacts, in some embodiments.

Figure 17:
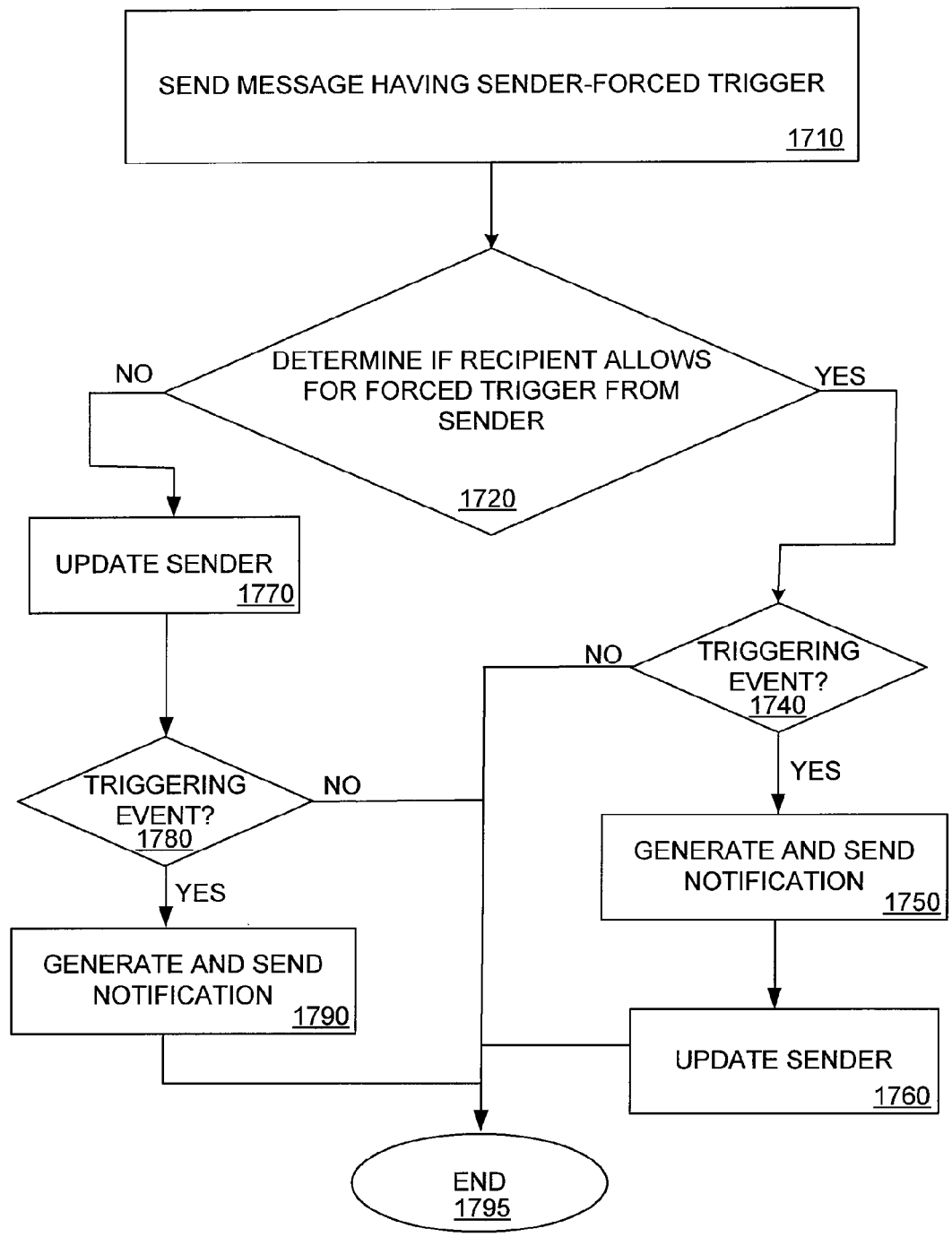

One embodiment of a method of message notification includes sending (1710) a message having a tag requesting a sender-forced notification to a recipient, as shown in the flow chart of FIG. 17. The messaging device R1 of the recipient receives the message and determines (1720) whether the recipient allows for sender-forced notifications. In some embodiments, a user may specify settings or parameters that grant to some senders a request for a sender-forced notification and deny requests from other senders for a sender-forced notification. If the request is granted, then the recipient device R1 determines (1740) whether an event has occurred that triggers the sending of the notification message. An event may comprise a passage of a set amount of time defined by the user and specified in the message sent by the sender and received by the recipient device. If an event has occurred, then a notification message is generated and sent (1750) to the recipient at another inbox of the recipient in accordance with preferences defined by the recipient. Further, in some embodiments, a follow up message is provided (1760) to the sender (by the messaging device R1) to inform the sender that the notification message was sent.

If the request by the sender for the sender-forced notification is denied (1730), then a follow up message is sent (1770) (by the messaging device R1) to inform the sender that the request was denied. Further, a triggering event defined by the recipient is checked by the recipient device R1. If the triggering event is detected to have occurred (1780), then a notification message is generated and sent (1790) to the recipient (by the messaging device R1), in accordance with preferences defined by the recipient. Otherwise, the process ends (1795).

As previously mentioned, the messaging device R2 may be configured to receive messages from the Internet, such as email messages, instant messages, etc. Also, the messaging or communication device R3 of the recipient may be configured to receive messages from another type of network or a different messaging protocol, such as a wireless telephone network, a PSTN telephone network, etc. To do so, a gateway device G receives the message from the communication network and converts the format of the message into a format that is compatible with the other network type and sends the newly formatted message to the recipient device R3.

Figure 18:
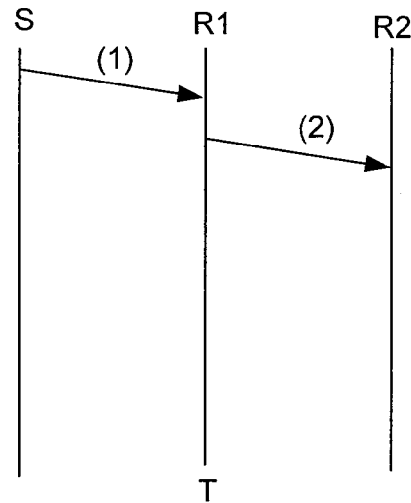
FIGS. 18-23 represent flow diagrams of operations performed by a sender's messaging device and messaging devices of a recipient, such as that featured in the system of FIG. 1.

FIGS. 18-23 represent flow diagrams of operations performed by the sender's messaging device S and messaging devices R1, R2 of a recipient. In the first example, as shown in FIG. 18, a sender sends (1) a message from the sender's messaging device S. The recipient's messaging device R1 receives the message. A triggering event T also occurs which causes a notification message to be sent (2) from the messaging device R1 to another messaging device R2 of the recipient, as reflected in the diagram.

Figure 19:
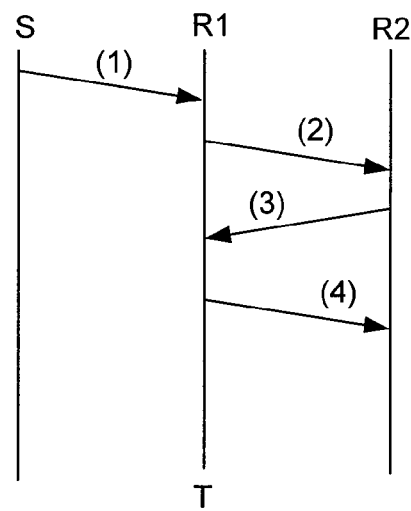

Another flow diagram scenario is presented in FIG. 19. Here, a sender sends (1) a message from the sender's messaging device S to the recipient's messaging device R1. The recipient's messaging device R1 receives the message. A triggering event T occurs which causes a notification message to be sent (2) from the messaging device R1 to another messaging device R2 of the recipient. In the notification message, options are contained that allow the recipient to choose instructions that are to be relayed to the messaging device R1. Accordingly, the recipient selects an option on which instructions to send (e.g., an option to send a copy of the entire message from the messaging device R1) and the message is sent (3) with the instructions to the messaging device R1.

Accordingly, a response may be sent (4) from the messaging device R1 to the messaging device R2 in response to carrying out the instruction. One response may be that a copy of the whole message, as received by the messaging device R1 from the sender, is sent to the messaging device R2.

Figure 20:
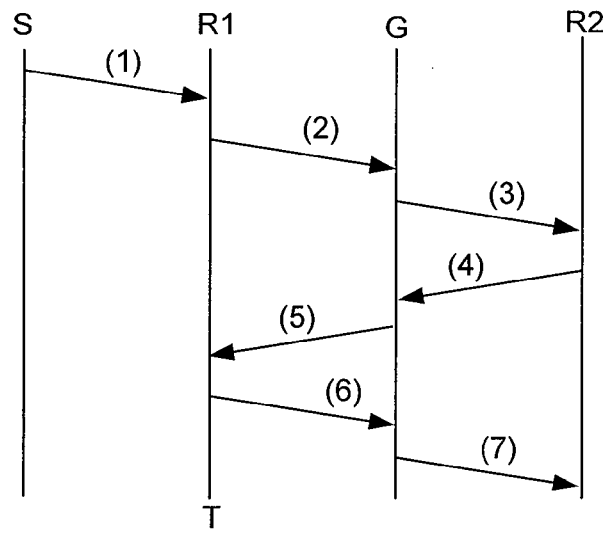

An additional flow diagram scenario is presented in FIG. 20. Here, a sender sends (1) a message from the sender's messaging device S to the recipient's messaging device R1. Note, the message may be relayed using one or more messaging servers 140. The recipient's messaging device R1 receives the message.

A triggering event T also occurs at the messaging device R1 which causes a notification message to be sent from the messaging device R1 to another messaging device R2 of the recipient. First, the message is delivered (2) from the messaging device R1 to the gateway G. The gateway G reformats the message into a format recognized by another messaging device R2 of the recipient and sends (3) the reformatted message to the messaging device R2. Note, the messaging devices R1, R2 may follow different messaging protocols.

In the notification message, options are contained that allow the recipient to choose instructions that are to be relayed to the messaging device R1. Accordingly, the recipient selects an option (e.g., an option to send a copy of the entire message from the messaging device R1) and the message is sent (4) to the gateway device G but addressed for the sender. The gateway device G reformats the instructive message in a format accepted by the messaging device R1 and relays the instructive message (5) to the messaging device R1. One possible response to the instructive message may be that a copy of the whole message, as received by the messaging device R1 from the sender, is sent to the messaging device R2. In such a scenario, the messaging device R1 sends (6) a response to the gateway device G so that the response may be reformatted in a format accepted by the messaging device R2 and then sent (7) to the messaging device R2 of the recipient.

Figure 21:
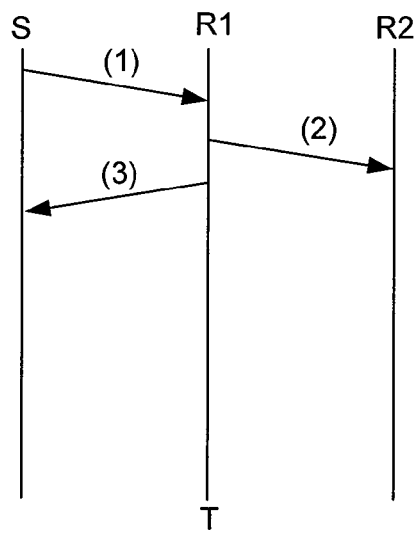

Another flow diagram scenario is represented in FIG. 21. Here, a sender sends (1) a message from the sender's messaging device S to the recipient's messaging device R1. Note, the message may be relayed using one or more messaging servers 140. The recipient's messaging device R1 receives the message. A triggering event T also occurs which causes a notification message to be sent (2) from the messaging device R1 to another messaging device R2 of the recipient. It may be that the trigger event was caused by a request for a sender-forced notification message. If this is the case, an update message may then be sent (3) from the messaging device R1 to the sender's messaging device S to inform the sender that the request was granted and a notification message has been sent.

Figure 22:
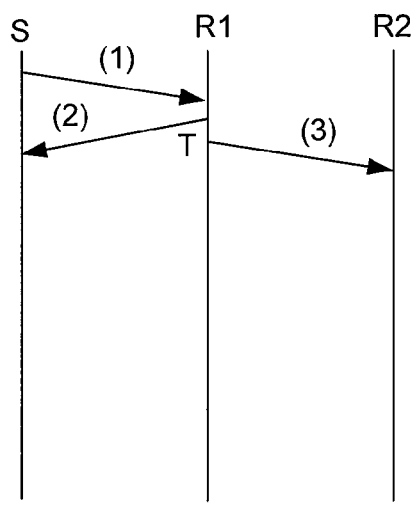

In FIG. 22, a flow diagram scenario is represented, where a sender sends (1) a message from the sender's messaging device S to the recipient's messaging device R1. Note, the message may be relayed using one or more messaging servers (not shown). The recipient's messaging device R1 receives the message. A triggering event T also occurs which causes a notification message to be sent (3) from the messaging device R1 to another messaging device R2 of the recipient.

The message from the sender contains a request for a sender-forced notification. However, the messaging device R1 has been configured to not grant a request for a sender-forced notification. Therefore, the trigger in this case is caused by another event not associated with the request for a sender-forced notification.

In response to a denial of the request for a sender-forced notification, the messaging device R1 sends a follow up message to the sender's messaging device S to inform the sender that the request was denied. As previously mentioned, the messaging device R1 also sends (3) a notification message to the messaging device R2 in response to triggering event T (which is independent of the sender-forced notification request).

Figure 23:
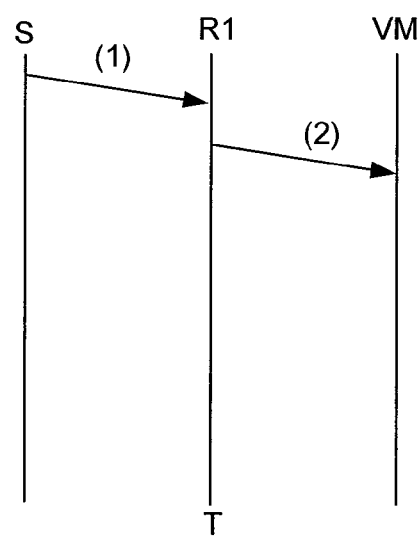

Referring now to FIG. 23, a flow diagram scenario is represented, where a sender sends (1) a message from the sender's messaging device S to the recipient's messaging device R1. Note, the message may be relayed using one or more messaging servers 140. The recipient's messaging device R1 receives the message. A triggering event T also occurs at the messaging device R1 which causes a notification message to be sent (2) from the messaging device R1 to a voice mailbox VM for the recipient. Note, the message may be reformatted using the gateway device G before the notification message is delivered to the voice mailbox VM of the recipient.

Figure 24:
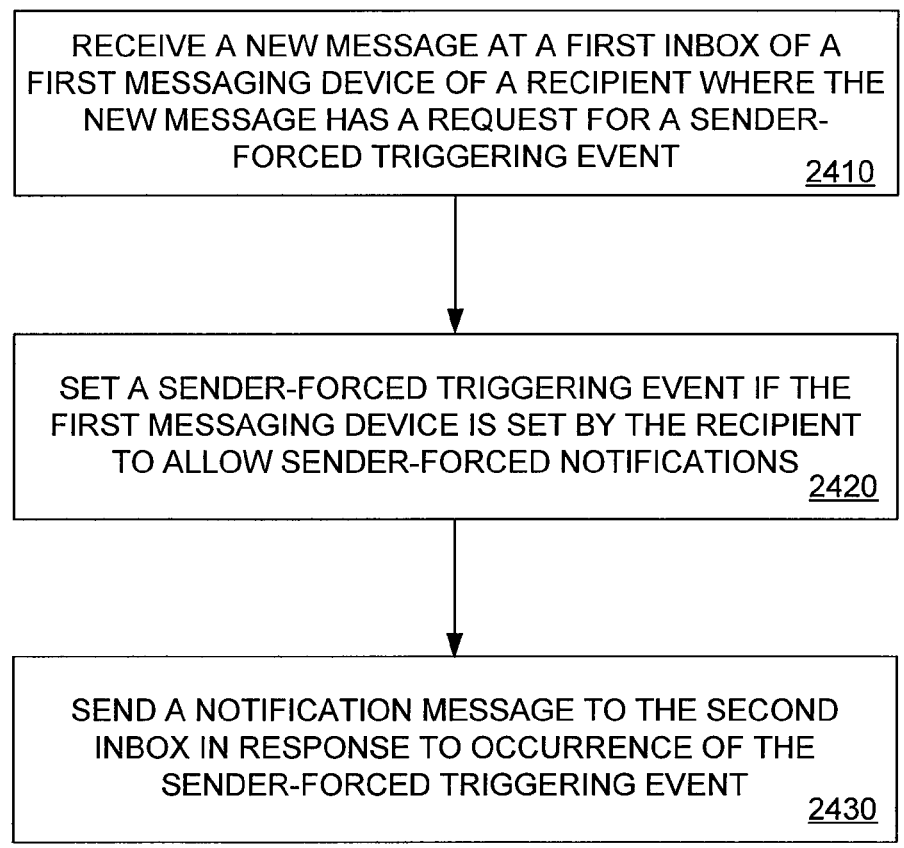
FIGS. 24-25 are flow chart diagrams illustrating embodiments of message notification methods.

Referring now to FIG. 24, a flow chart illustrating one embodiment, among others, of a message notification method is shown. The method includes receiving (2410) a new message at a first inbox of a first messaging device, such as the messaging device R1, of a recipient. The new message has a request for a sender-forced triggering event to be set at the first messaging device R1 of the recipient such that a notification message for the new message is sent to a second inbox of a second messaging device, such as the messaging device R2, of the recipient if the sender-forced triggering event occurs. The method further includes setting (2420) the sender-forced triggering event if the first messaging device R1 is set by the recipient to allow sender-forced notifications and sending (2430) a notification message to the second inbox in response to occurrence of the sender-forced triggering event.

Figure 25:
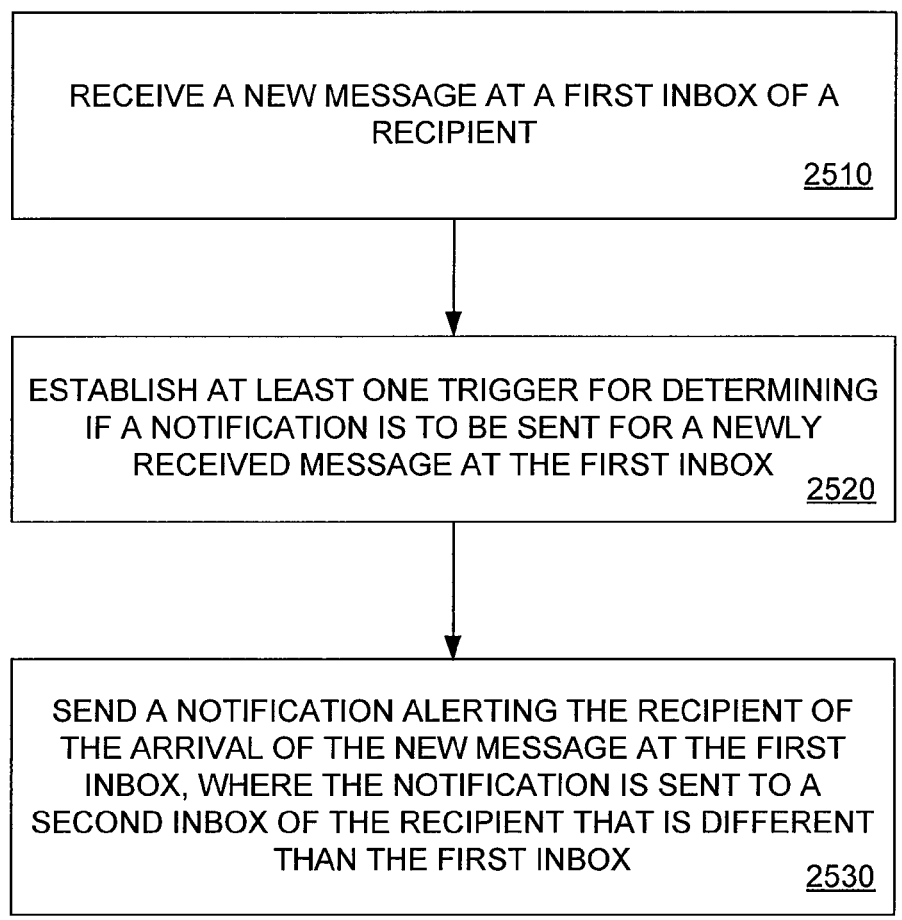

FIG. 25 is a flow chart illustrating another embodiment, among others, of a message notification method. The method includes receiving (2510) a new message at a first inbox of a recipient and establishing (2520) at least one trigger for determining if a notification is to be sent for a newly received message at the first inbox. The message further includes sending (2530) a notification alerting the recipient of the arrival of the new message at the first inbox, where the notification is sent to a second inbox of the recipient that is different than the first inbox.

System components of certain embodiments of the present disclosure can be implemented in hardware, software, firmware, or a combination thereof. In some embodiments, the system components may be implemented in software or firmware that is stored in a memory and that is executed by a suitable instruction execution system. If implemented in hardware, as in some embodiments, system components can be implemented with any or a combination of the following technologies, which are all well known in the art: a discrete logic circuit(s) having logic gates for implementing logic tasks upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical tasks or steps in the process, and alternate implementations are included within the scope of the preferred embodiment of the present invention in which tasks may be executed out of order from that shown or discussed, including substantially concurrently or in reverse order, depending on the nature of the tasks involved, as would be understood by those reasonably skilled in the art of the present disclosure.

One or more software components can be embodied in any computer-readable medium for use by or in connection with an instruction execution system, apparatus, or device, such as a computer-based system, processor-containing system, or other system that can fetch software instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the present disclosure. All such modifications and variations are intended to be included herein within the scope of this disclosure.

Therefore, having thus described the invention, at least the following is claimed:

1. A message notification method comprising:
    electronically receiving a new message at a first inbox of a recipient, the new message having a sender-forced trigger and, embedded within the new message, a request for a triggering event to be set at a messaging client device of the recipient such that a notification message for the new message is sent by the messaging client device to a second inbox of the recipient if the triggering event occurs in accordance to a priority ranking order and if the sender-forced trigger is denied based on a sender-forced trigger setting previously defined by the recipient;
    setting, via a processor, the triggering event at the messaging client device of the recipient in accordance with the priority ranking order if the sender-forced trigger is denied, wherein the priority ranking order is previously defined by the recipient and indicates which requests for triggering events to send a notification message are to be granted responsive to receiving the new message;
    sending a denial notification to a sender of the new message in response to the sender-forced trigger being denied; and
    sending a notification message to the second inbox in response to occurrence of the triggering event and the triggering event being associated with a priority ranking having a higher priority ranking than associated priority rankings of any other triggering events that have also occurred,
    wherein the request for the triggering event includes a time period specified by the sender of the new message, wherein the time period is timed upon receipt of the new message by the messaging client device,
    wherein the triggering event is triggered responsive to the new message not being viewed at the messaging client device within the time period.

2. The method of claim 1, further comprising:
    sending a follow-up message to the sender of the new message to alert the sender of the new message that the notification message was sent to the recipient as a result of the request for the triggering event.

3. The method of claim 1, wherein the priority ranking order indicates that the request for the triggering event supersedes a triggering event set by the recipient.

4. The method of claim 1, further comprising:
    canceling the triggering event if the recipient retrieves the new message from the first inbox before expiration of the time period.

5. A non-transitory computer-readable medium storing computer program instructions, the computer program instructions for message notification, which, when executed on a processor cause the processor to perform operations comprising:
    electronically receiving a new message at a first inbox of a first messaging device of a recipient, the new message having a sender-forced trigger and, embedded within the new message, a request for a triggering event to be set at the first messaging device of the recipient such that a notification message for the new message is sent in accordance with a priority ranking order by the first messaging device to a second inbox of a second messaging device of the recipient if the triggering event occurs and if the sender-forced trigger is denied based on a sender-forced trigger setting previously defined by the recipient;
    setting the triggering event at the first messaging device of the recipient in accordance with the priority ranking order if the sender-forced trigger is denied, wherein the priority ranking order is previously defined by the recipient and indicates which requests for triggering events to send a notification message are to be granted responsive to receiving the new message;
    sending a denial notification to a sender of the new message in response to the sender-forced trigger being denied; and
    sending a notification message to the second inbox in response to occurrence of the triggering event and the triggering event being associated with a priority ranking having a higher priority ranking than associated priority rankings of any other triggering events that have also occurred,
    wherein the request for the sender-forced triggering event includes a time period specified by the sender of the new message, wherein the time period is timed upon receipt of the new message by the first messaging device,
    wherein the triggering event is triggered responsive to the new message not being viewed at the first messaging device within the time period.

6. The non-transitory computer-readable medium of claim 5, the operations further comprising:
    sending a follow-up message to the sender of the new message to alert the sender of the new message that the notification message was sent to the recipient as a result of the request for the triggering event.

7. The non-transitory computer-readable medium of claim 5, the operations further comprising:
    failing to set the sender-forced trigger if the first messaging device is set by the recipient to prohibit sender-forced notifications.

8. The non-transitory computer-readable medium of claim 5, wherein the priority ranking order indicates that the request for the triggering event supersedes a triggering event set by the recipient.

9. A delayed message notification method comprising:

electronically receiving a new message at a first inbox of a messaging client device of a recipient, the new message having a sender-forced trigger and, embedded within the new message, a request for a notification message for the new message to be sent in accordance to a priority ranking order by the messaging client device to a second inbox if the new message has not been retrieved from the first inbox within a specified period of time and if the sender-forced trigger is denied based on a sender-forced trigger setting previously defined by the recipient, wherein the specified period of time is set by a sender of the new message and specified in the new message;

setting, via a processor, a triggering event at the messaging client device in accordance with the priority ranking order if the sender-forced trigger is denied and in response to the request for the notification message such that occurrence of the triggering event results in generation of a notification message to the second inbox, wherein the priority ranking order is previously defined by the recipient and indicates which requests for triggering events to send a notification message are to be granted responsive to receiving the new message;

detecting that the new message has not been retrieved from the first inbox within the specified period of time;

sending a denial notification to the sender of the new message in response to the sender-forced trigger being denied; and in response to detecting that the new message has not been retrieved within the specified period of time and that the triggering event is associated with a priority ranking which has a higher priority ranking than associated priority rankings of any other triggering events that have also occurred, retrieving an address for the second inbox and sending the notification message to the address of the second inbox.

10. The method of claim 9, wherein the first inbox comprises an inbox for messages of a first messaging protocol and the second inbox comprises an inbox for messages of a second messaging protocol, the second messaging protocol being different from the first messaging protocol.

11. The method of claim 9, wherein the first inbox comprises an inbox at a first webmail server and the second inbox comprises an inbox at a second webmail server.

12. The method of claim 9, further comprising:

sending a follow-up message to the sender of the new message to alert the sender of the new message that the notification message was sent to the recipient as a result of the request for the notification message.

13. The method of claim 9, further comprising:

sending a follow-up message to the sender of the new message to alert the sender of the new message that the request for the notification message was denied by the recipient.

14. The method of claim 9, further comprising:

canceling the triggering event if the recipient retrieves the new message from the first inbox before expiration of the time period.

* * * * *